(12) United States Patent
Willis et al.

(10) Patent No.: US 8,713,896 B2
(45) Date of Patent: May 6, 2014

(54) TOWER STRUCTURE AND METHOD OF ASSEMBLING

(75) Inventors: Jeffrey O. Willis, Blair, NE (US); John Menichetti, Blair, NE (US)

(73) Assignee: Northstar Endeavors, LLC, Blair, NC (US)

(*) Notice: Subject to any disclaimer, the term of this patent is extended or adjusted under 35 U.S.C. 154(b) by 0 days.

(21) Appl. No.: 13/406,731

(22) Filed: Feb. 28, 2012

(65) Prior Publication Data

US 2012/0151864 A1   Jun. 21, 2012

Related U.S. Application Data

(63) Continuation-in-part of application No. 12/247,551, filed on Oct. 8, 2008, now Pat. No. 8,136,329.

(60) Provisional application No. 60/978,691, filed on Oct. 9, 2007.

(51) Int. Cl.
*E04C 3/00* (2006.01)
*E04H 12/00* (2006.01)
*E04B 1/00* (2006.01)

(52) U.S. Cl.
USPC .............. 52/848; 52/836; 52/849; 52/651.01; 52/745.17; 52/745.16

(58) Field of Classification Search
USPC ................ 52/848, 836, 849, 651.01, 745.17, 52/745.18
See application file for complete search history.

(56) References Cited

U.S. PATENT DOCUMENTS

| | | | | | |
|---|---|---|---|---|---|
| 3,196,990 | A | * | 7/1965 | Handley | 52/844 |
| 3,217,459 | A | * | 11/1965 | Meyer | 52/28 |
| 3,276,182 | A | * | 10/1966 | Handley | 52/844 |
| 3,360,288 | A | * | 12/1967 | Holscher | 52/638 |
| 3,728,837 | A | * | 4/1973 | Kiefer, Jr. | 52/844 |
| 4,248,025 | A | * | 2/1981 | Kleine et al. | 52/845 |
| 4,272,929 | A | * | 6/1981 | Hanson | 52/40 |
| 4,906,150 | A | * | 3/1990 | Bennett | 411/119 |
| 4,934,114 | A | * | 6/1990 | Lindsey | 52/40 |
| 5,085,548 | A | * | 2/1992 | Moyles | 411/316 |
| 5,117,607 | A | * | 6/1992 | Bourdon | 52/845 |

(Continued)

FOREIGN PATENT DOCUMENTS

| | | |
|---|---|---|
| GB | 2203767 | 10/1988 |
| WO | 03069099 | 8/2003 |
| WO | 2006050723 | 5/2006 |

OTHER PUBLICATIONS

International Search Report and Written Opinion for PCT/US08/79207 dated Dec. 5, 2008; (12 pages).

(Continued)

*Primary Examiner* — Mark Wendell
(74) *Attorney, Agent, or Firm* — Polsinelli PC

(57) ABSTRACT

A modular tower structure is described herein. The modular tower uses a cost-effective, efficient design that reduces the amount of steel necessary for tower structures for wind turbines. The modular tower is constructed from sections. The sections are constructed from panels. The panels comprise a curved or arcuate shape. The panels include vertical edges and horizontal edges. A vertical connection connects or secures the panels at the vertical edges of the panels and forms the sections. The sections have a generally circular shape. A horizontal connection connects or secures the sections at the horizontal edges of the panels.

19 Claims, 20 Drawing Sheets

(56) References Cited

U.S. PATENT DOCUMENTS

| | | | | |
|---|---|---|---|---|
| 6,157,088 | A * | 12/2000 | Bendix | 290/55 |
| 6,173,537 | B1 * | 1/2001 | Davidsson et al. | 52/40 |
| 6,278,198 | B1 * | 8/2001 | Willis et al. | 290/55 |
| 6,380,909 | B1 * | 4/2002 | Wilkinson et al. | 343/890 |
| 6,408,575 | B1 * | 6/2002 | Yoshida et al. | 52/40 |
| 6,470,645 | B1 * | 10/2002 | Maliszewski et al. | 52/745.18 |
| 6,505,785 | B2 * | 1/2003 | Willis et al. | 290/55 |
| 6,522,025 | B2 * | 2/2003 | Willis et al. | 290/55 |
| 6,532,700 | B1 * | 3/2003 | Maliszewski et al. | 52/40 |
| 6,557,312 | B2 * | 5/2003 | McGinnis | 52/296 |
| 6,755,407 | B1 * | 6/2004 | Olson et al. | 269/49 |
| 6,907,706 | B1 * | 6/2005 | Schippmann et al. | 52/848 |
| 6,957,518 | B1 * | 10/2005 | Koch, Jr. | 52/849 |
| 7,114,295 | B2 * | 10/2006 | Wobben | 52/40 |
| 7,160,085 | B2 * | 1/2007 | de Roest | 416/244 R |
| 8,322,093 | B2 * | 12/2012 | Zavitz et al. | 52/223.5 |
| 2003/0147753 | A1 * | 8/2003 | Ollgaard | 416/244 A |
| 2006/0272244 | A1 * | 12/2006 | Jensen | 52/223.5 |
| 2009/0021019 | A1 | 1/2009 | Thomsen | |
| 2009/0090069 | A1 | 4/2009 | Willis | |
| 2012/0036793 | A1 | 2/2012 | Janesky et al. | |
| 2012/0151864 | A1 | 6/2012 | Willis et al. | |

OTHER PUBLICATIONS

International Search Report and Written Opinion for PCT/US13/27939 dated May 3, 2013; (10 pages).

* cited by examiner

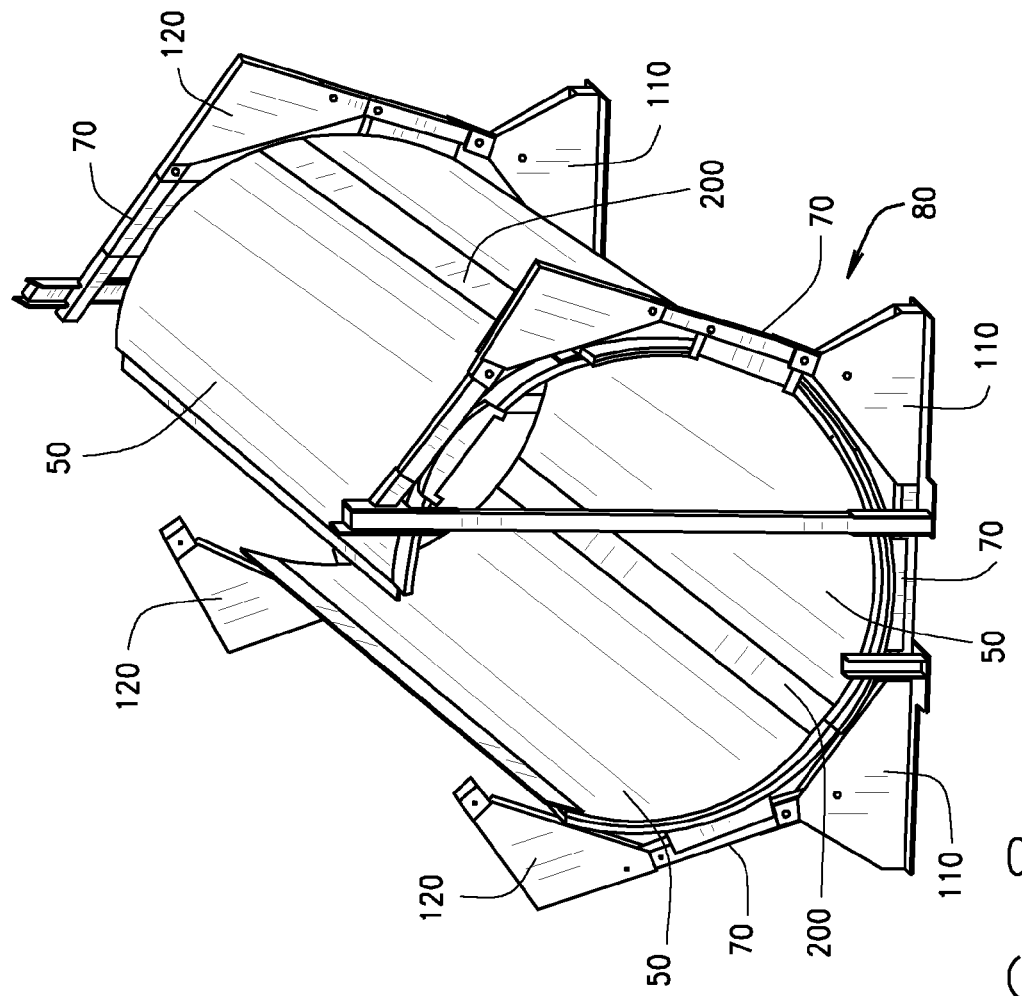
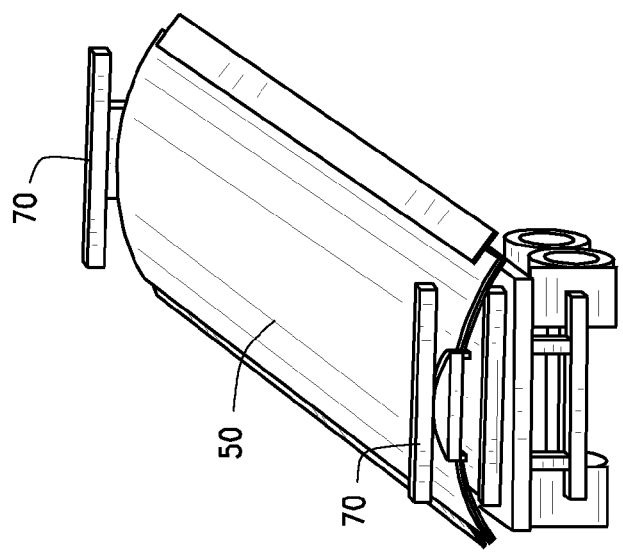
FIG. 8

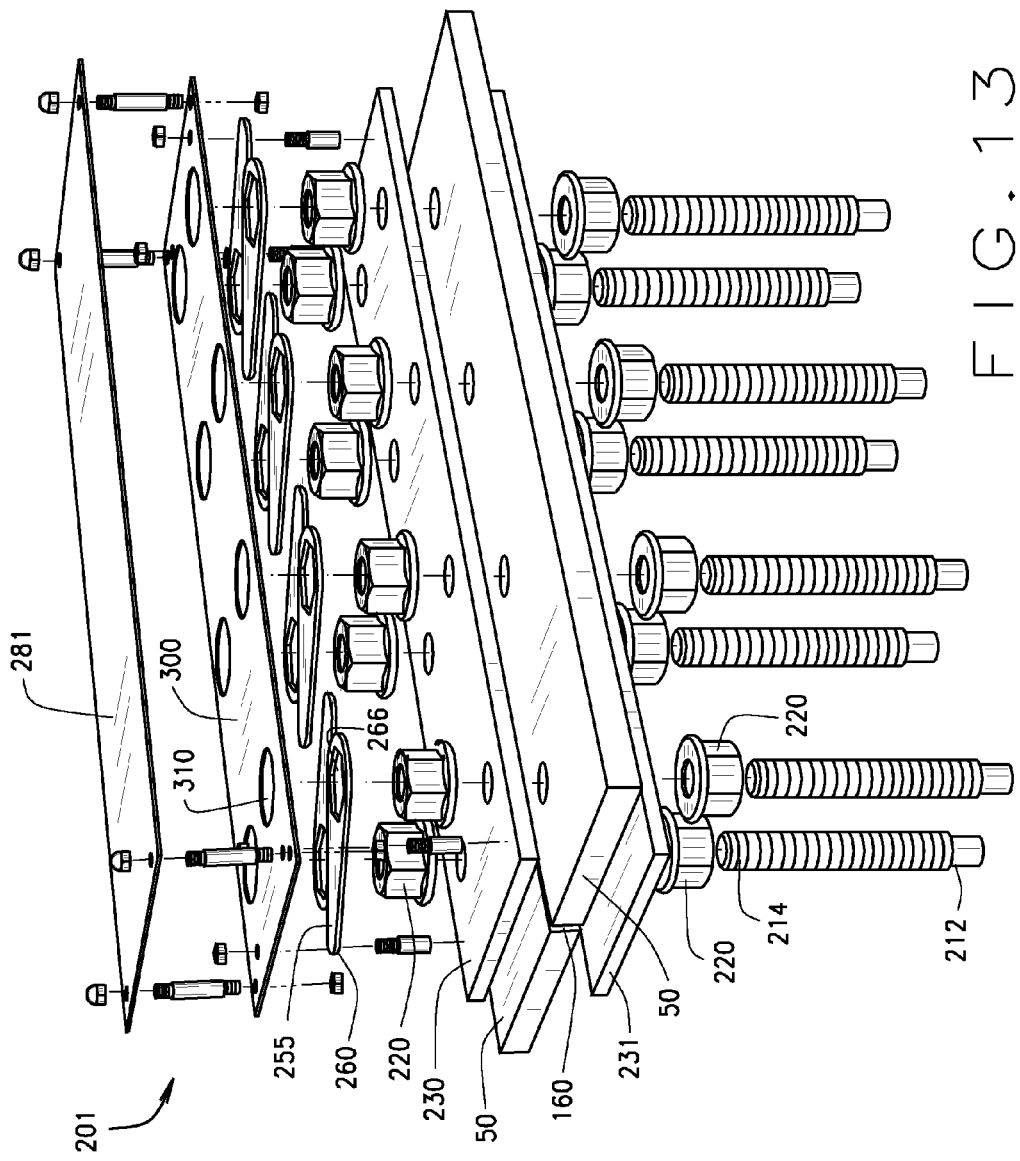

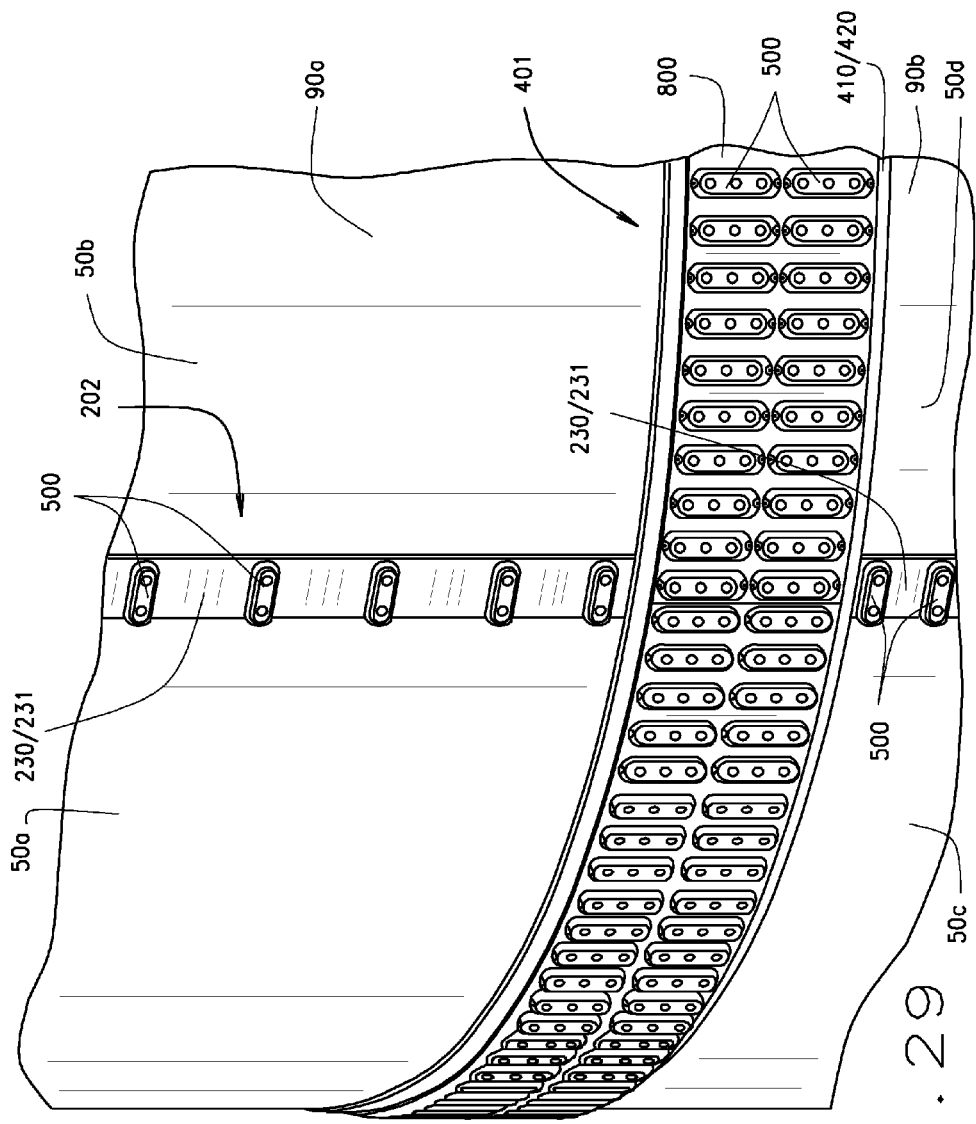

TOWER STRUCTURE AND METHOD OF ASSEMBLING

REFERENCE TO RELATED APPLICATION

This application is a continuation-in-part of U.S. patent application Ser. No. 12/247,551 filed Oct. 8, 2008 which claims priority to U.S. Provisional Patent Application Ser. No. 60/978,691, filed on Oct. 9, 2007.

FIELD OF INVENTION

The present invention relates to a modular tower and a method of constructing the modular tower.

BACKGROUND OF INVENTION

Prior attempts in constructing modular towers have used flange connections or load-bearing bolts to hold portions of the tower together, however, the flange connections and the load-bearing bolts suffer from fatigue and may fail. Towers for wind turbines are subjected to near constant forces from the revolution of the turbine, which may break down the flange connections or load-bearing bolt connections. Further, the flange connections on large welded pieces are expensive and difficult to manufacture. The manufacturing tolerances for the flange connections are difficult to satisfy and result in limited commercial availability.

Other prior attempts in constructing towers have involved the use of lattice towers made from metal. However, such lattice towers suffer from numerous drawbacks, including significant labor cost for installation and maintenance of the tower. The lattice towers also require an excessive area of space for the base or ground-contacting portion of the lattice tower. The lattice towers also have a tendency to attract birds and other wildlife, as the lattice towers have a generally open construction, which provides habitat for the birds and animals. Further, the lattice towers do not provide a closed working space for technicians. The lattice towers also require ongoing maintenance in checking the tightness of the bolts that are used in the construction of the lattice tower.

Other towers have involved the use of concrete slabs in construction. However, such concrete towers weigh too much to be feasible.

SUMMARY

A modular tower structure is described herein. The modular tower uses a cost-effective, efficient design that reduces the amount of steel necessary for tower structures for wind turbines. The modular tower is constructed from sections. The sections are constructed from panels.

The modular tower structure comprises a plurality of the sections, wherein the sections comprise a plurality of the panels. The panels comprise a curved or arcuate shape. The panels comprise vertical edges and horizontal edges. A vertical connection connects or secures the panels at the vertical edges of the panels and forms the sections. The sections have a generally circular shape. The vertical connection comprises an interior vertical friction plate positioned over a seam between adjacent panels and an exterior vertical friction plate positioned over the seam between adjacent panels. A horizontal connection connects or secures the sections at the horizontal edges of the panels. The horizontal connection comprises an interior friction plate that covers a seam between the adjacent sections and an exterior friction plate that covers the seam between the adjacent sections.

The modular tower and a methods of constructing the modular tower described herein provide many advantages. The modular tower may be assembled and maintained from the inside of the tower structure. As such, the technician is protected by the tower structure during assembly and maintenance, thus providing a safer work environment. Further, exterior ladders or other mechanical lift equipment are not required for maintenance. The components of the modular tower are less expensive and less complicated to manufacture and/or procure. The tolerances needed for the components are easier to satisfy. The size of the components of the modular tower reduce transportation costs, as standard over-the-road trucks may be used without the need for escorts or special permits. The design of the modular tower provides better fatigue characteristics providing for a more efficient use of steel and other metals. As the fatigue characteristics are improved compared to conventional towers, less steel and metal may be used in the design of the modular towers described herein. The less steel and metal required by the modular tower designs described herein results in a cost savings as compared to conventional towers.

BRIEF DESCRIPTION OF DRAWINGS

FIGS. 3-9 show the delivery of the panels and the assembly of one of the sections.

FIG. 13 shows an exploded view of the second embodiment of the vertical connection that connects or secures the panels together.

FIG. 29 shows a perspective view of the fastener pack and tray assembled on the tower.

DETAILED DESCRIPTION OF PREFERRED EMBODIMENTS

Figure 1:
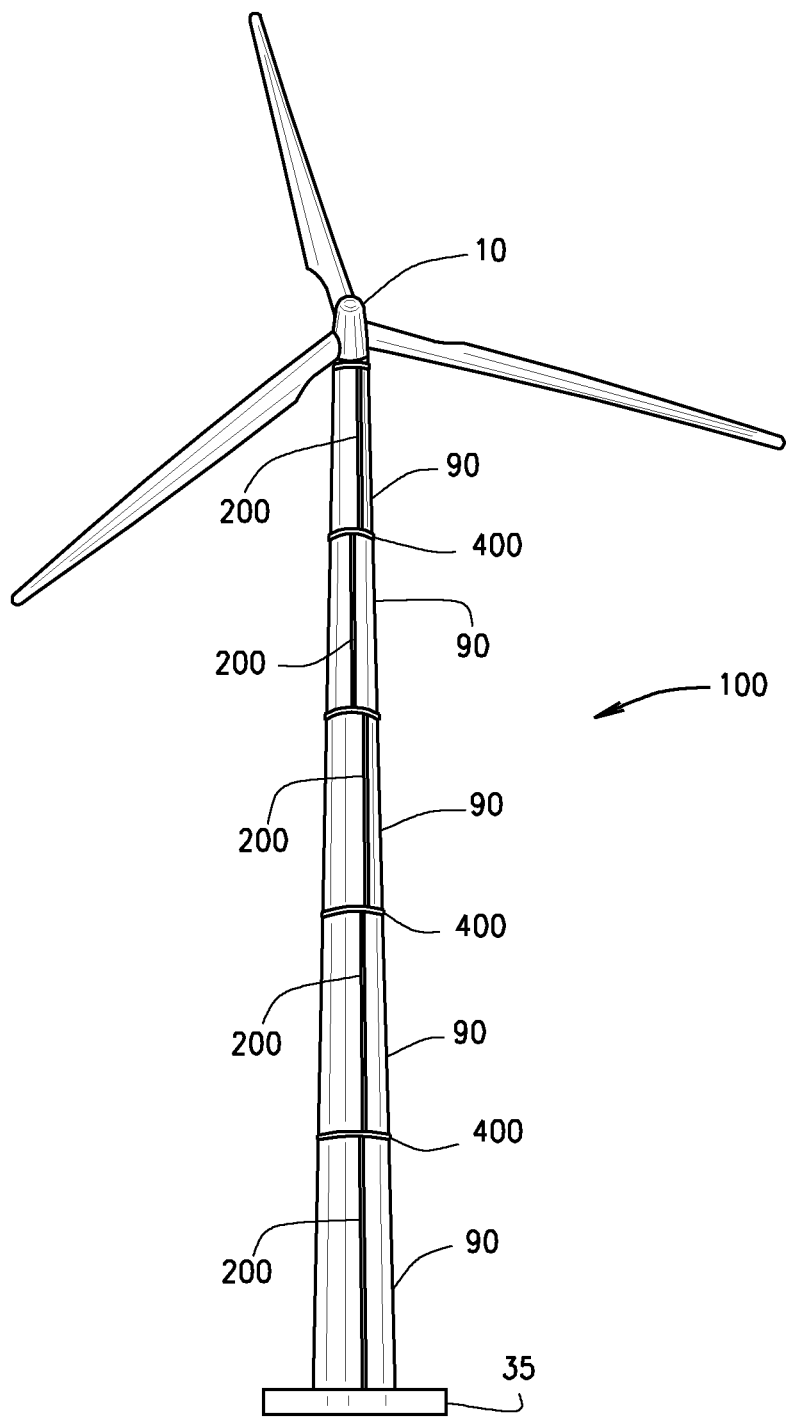
FIG. 1 is a view of the modular tower structure.

Herein is described a modular tower structure and method of assembling the modular tower structure. The modular tower structure comprises a plurality of panels that are assembled into a plurality of sections at the construction or assembly site to form the tower structure. A vertical connection between the panels secures or connects the panels together in order to form each section. The sections are stacked upon each other and fastened or secured together to form the modular tower. A horizontal connection between the sections fastens or connects the sections together.

The towers may be used to support wind turbines for the generation of electricity. Two to five megawatt turbines or other turbines may be positioned on the tower structure. Although the towers are well suited to support the wind turbines, the modular tower structure may be used for other purposes, such as, for example, supporting communications equipment, electrical utility lines, etc.

The panels typically are made of a mild steel or other metal alloy. Grade 50 steel is one suitable steel for use in the panels. The panels generally have a curved or arcuate shape such that a plurality of the panels may be joined to form the section. The sections have a generally circular outer diameter. Additional panels are further joined to form additional sections which are stacked and fastened or secured onto a first section. A plurality of the sections are used to form the modular tower structure.

The panels may be transported to the jobsite via conventional over-the-road trucks. Preferably, the panels do not have a width greater than approximately 12 feet such that conventional over-the-road trucking may be used to deliver the panels to the jobsite without the need for escorts. As standard over-the-road trucking transportation may be utilized to deliver the panels to the jobsite, a significant savings in transportation costs is realized by the use of the modular tower structure and methods described herein, as compared to other towers which require the use of specialized trucks, escorts for the trucks, and special permitting for transportation.

The modular tower structure described herein provides for a cost effective tower that exceeds current typical building heights of 80 meters. The modular tower structure may operate above the 80 meter level. Generally, the higher the turbine is positioned on top of the tower, the more wind there is available for electrical generation at the turbine. At the higher elevations, there is less turbulence as the turbulent effects of the ground on the wind are lessened. Wind turbines may operate more efficiently and with greater output at these higher elevations. The use of the higher towers will allow wind powered electricity to be used in more places not currently economically feasible for the generation of wind powered electricity with conventional tower structures. The modular tower described herein satisfies the demand by wind turbine manufacturers for cost-effective towers for large turbines (2 megawatts and above) that current tower designs do not meet.

Figure 2:
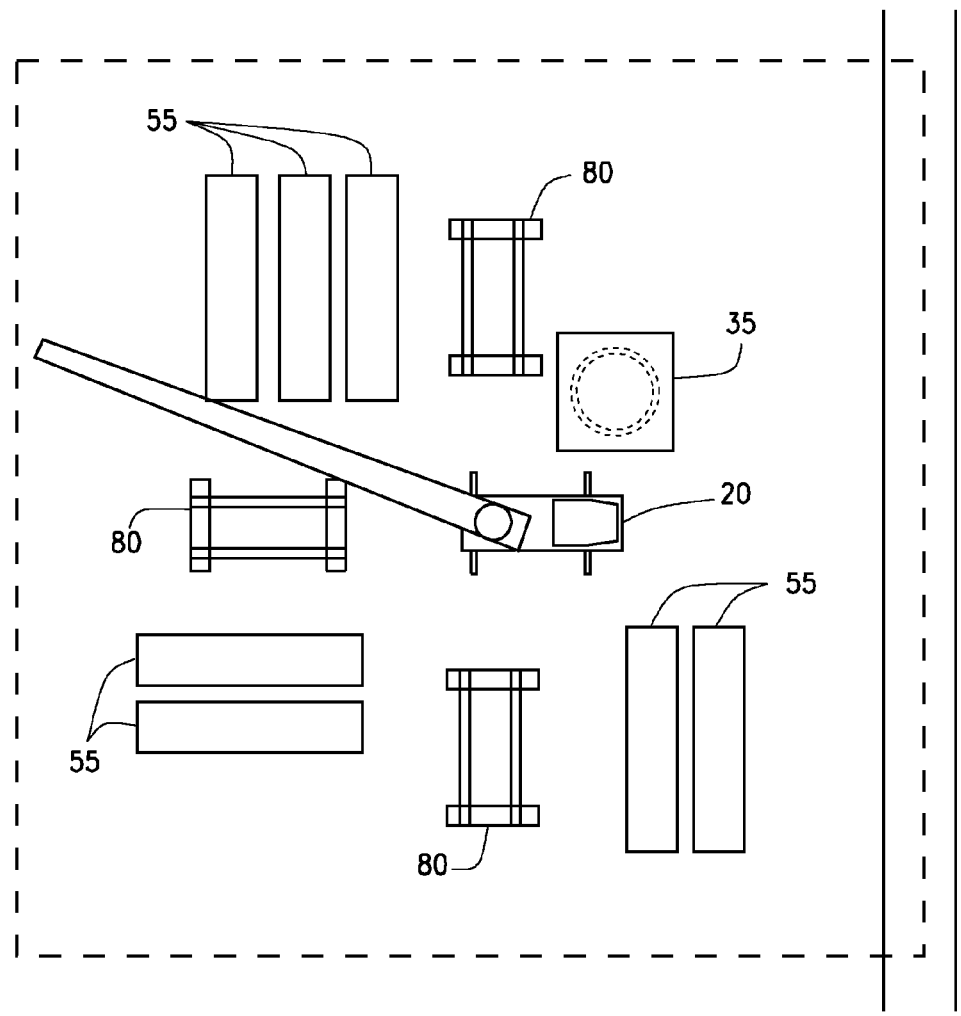
FIG. 2 is a plan view of the assembly site for the modular tower.
Figure 3:
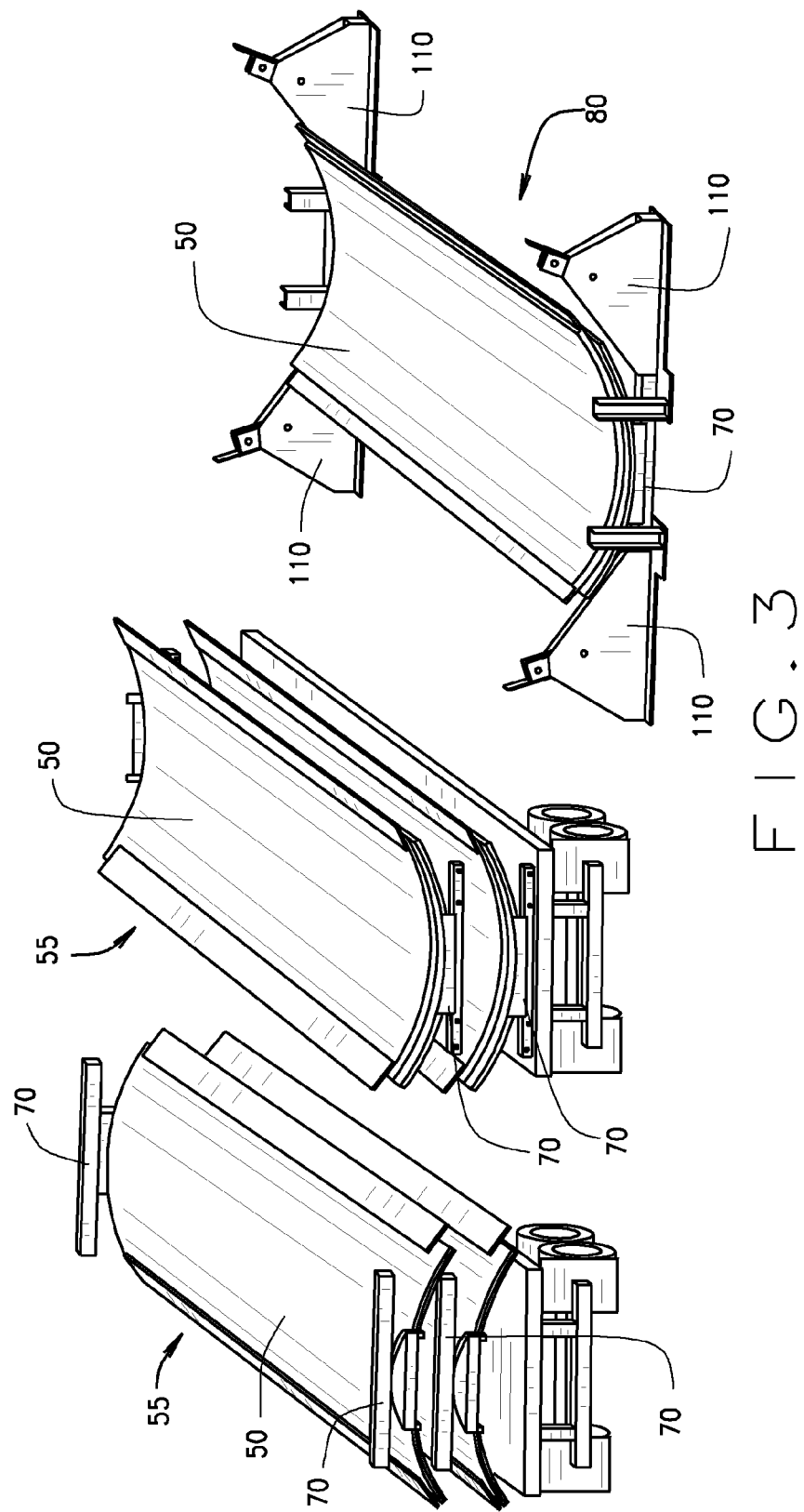
Figure 4:
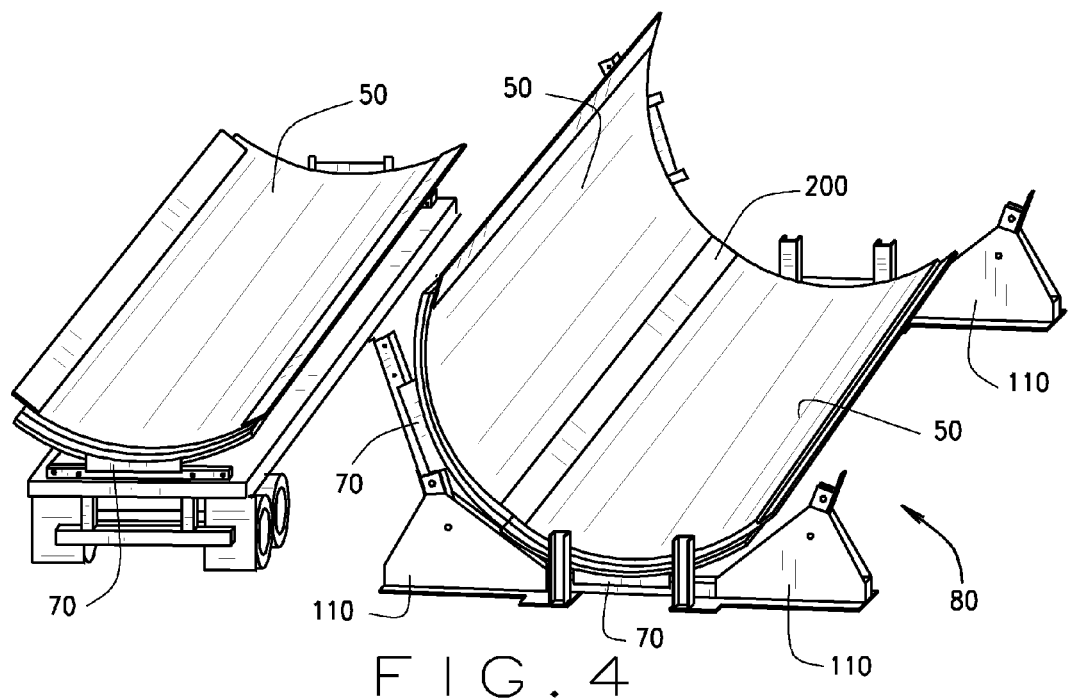
Figure 5:
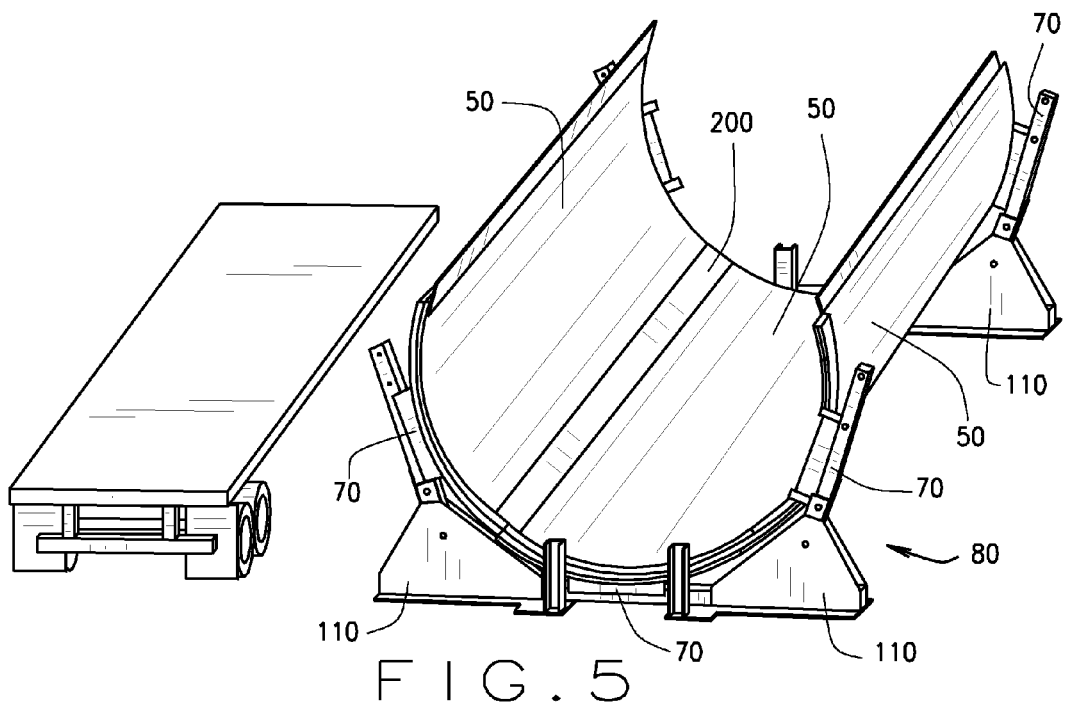
Figure 6:
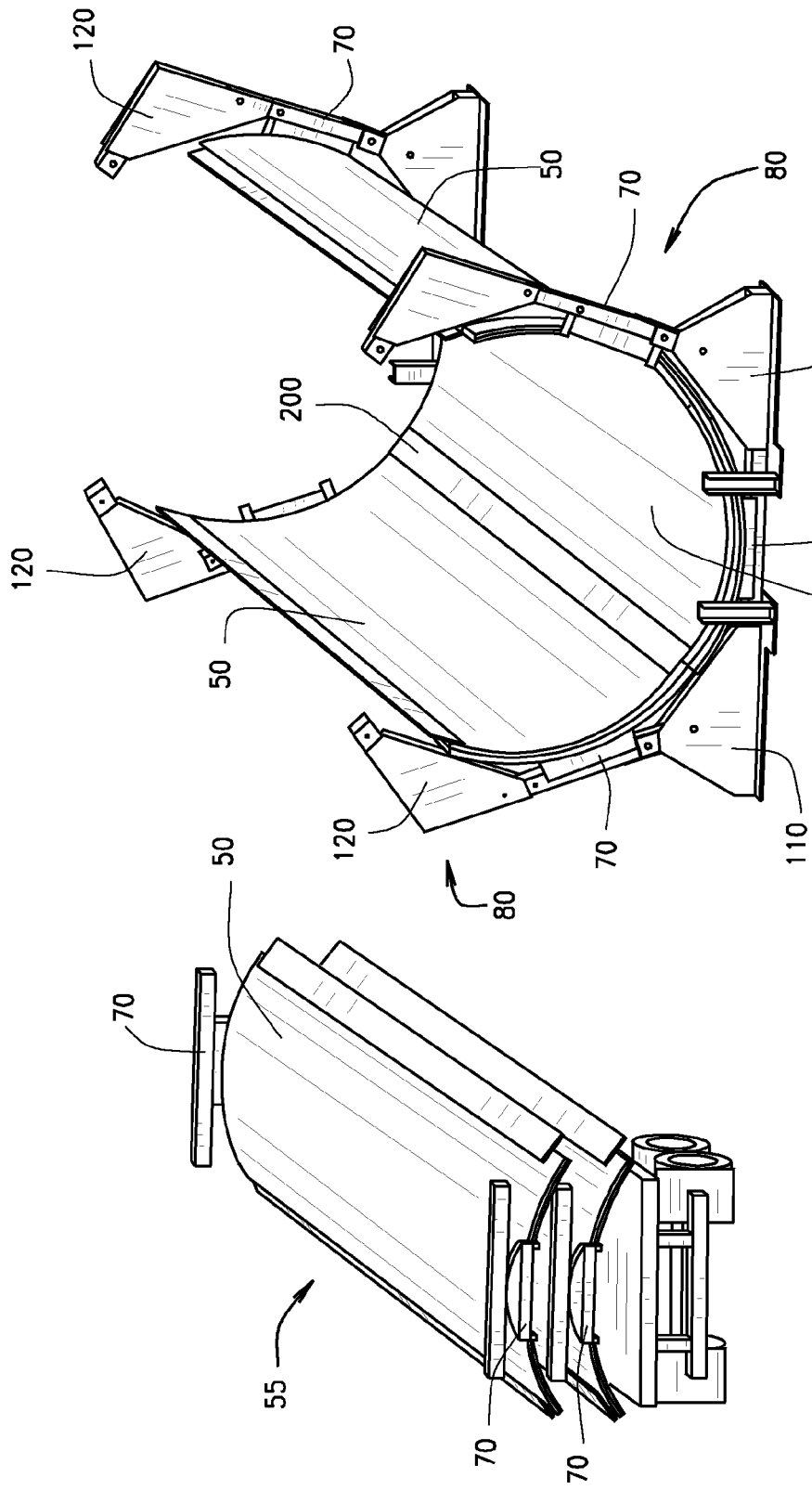
Figure 7:
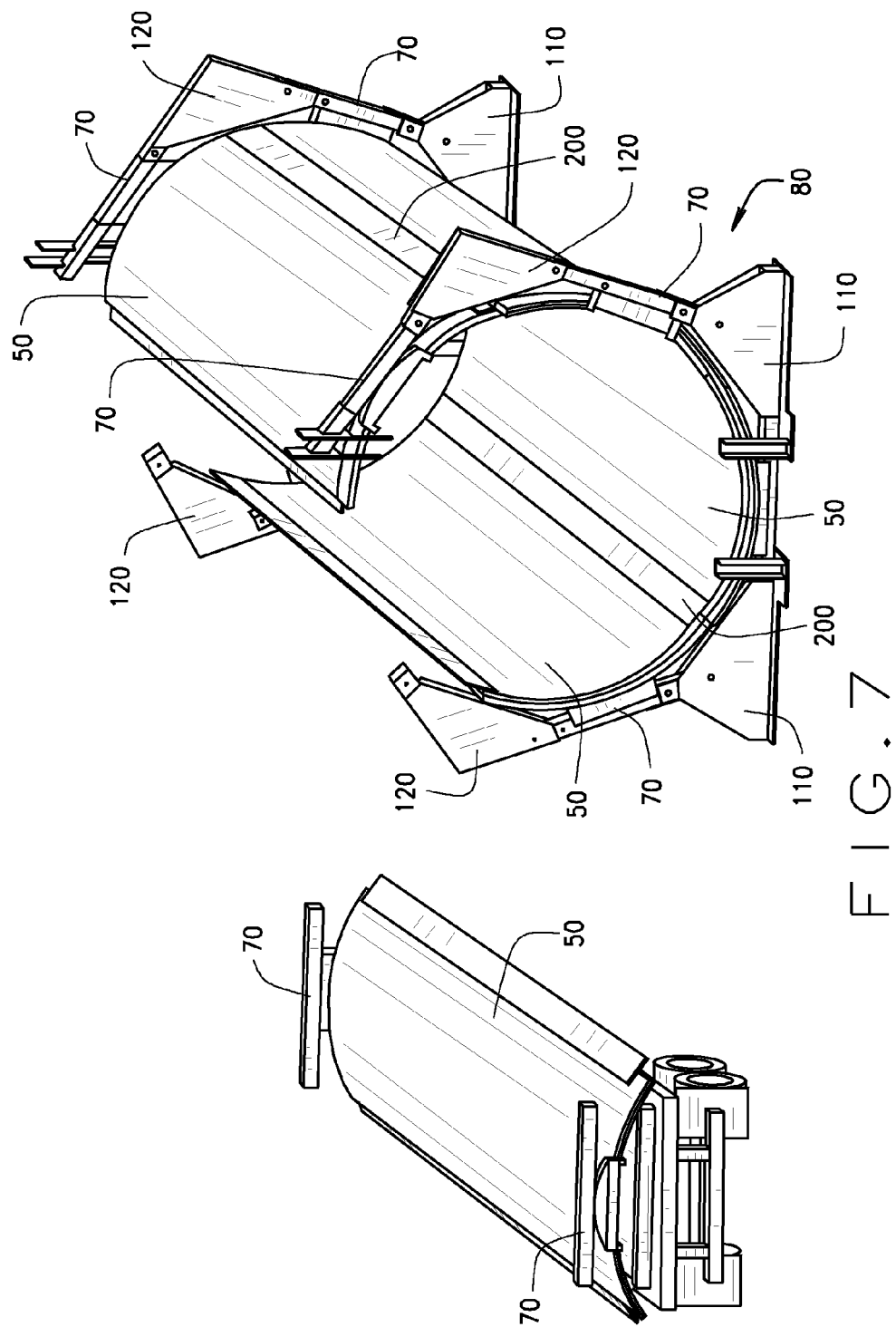

The modular tower and the method of constructing the modular tower will now be described with reference to the figures. A fully assembled modular tower 100 is shown in FIG. 1. The modular tower 100 is shown supporting a wind turbine 10. A plan view of the assembly site for the modular tower 100 is shown in FIG. 2. The assembly process of the modular tower 100 is shown in FIGS. 3-9.

A truck arrives at the construction site carrying one or more panels 50. The panels 50 include frame members 70 that were previously attached to the panels 50 at the factory or other assembly/distribution center. The frame members 70 are attached to an exterior surface of the panels 50.

The panels 50 are provided in shipping bundles 55 to ease in loading, transportation, unloading, and assembly. The shipping bundles 55 comprise two or more panels 50. The shipping bundles 55 include the panels 50 in a stacked configuration. The frame members 70 assist in the stacking of the panels 50 into the shipping bundles 55. The shipping bundles 55 also provide for two-point loading and unloading.

Figure 9:
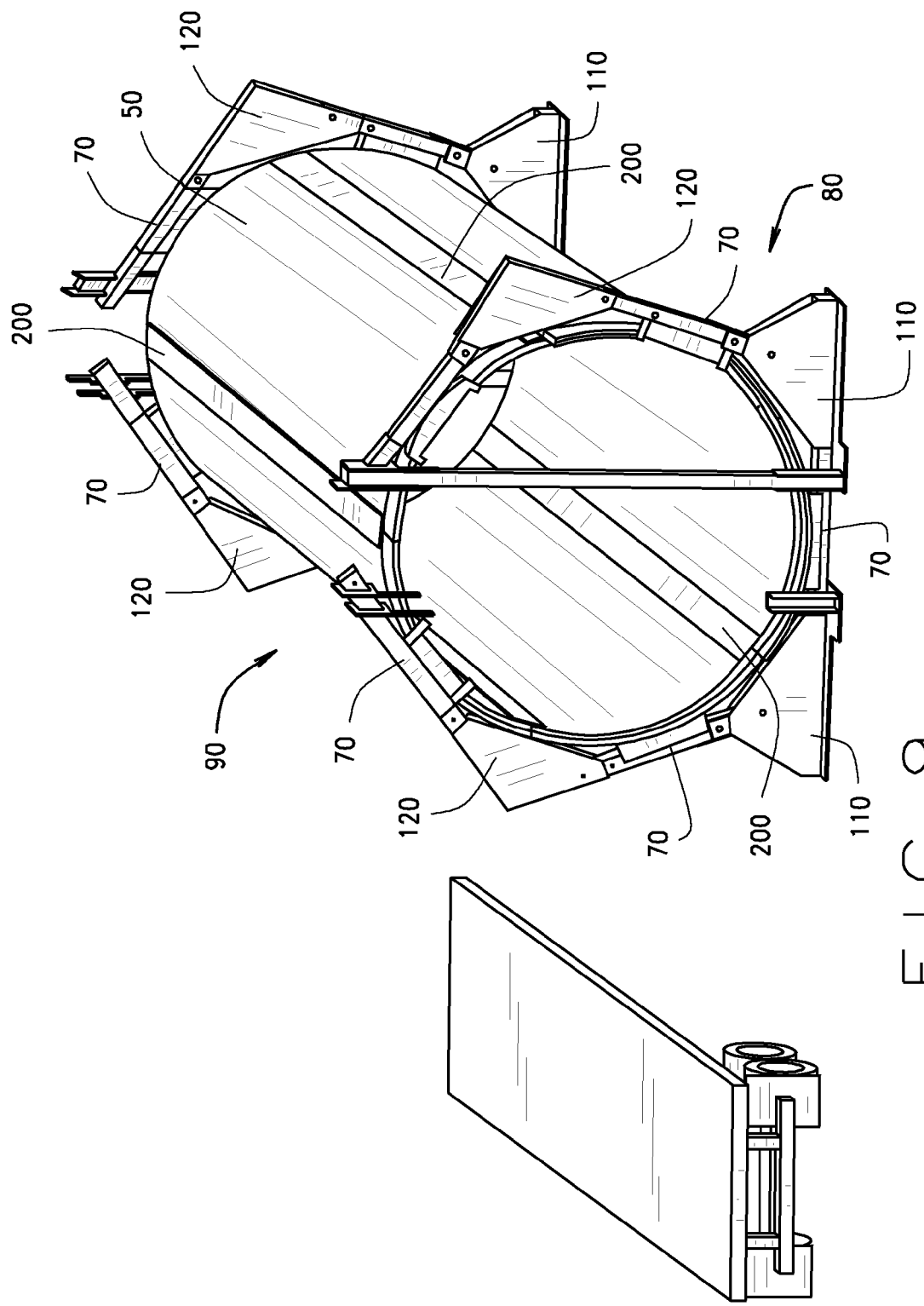

The plan view of the assembly site for the modular tower 100 in FIG. 2 shows the bundles 55. The panels 50 are removed from the bundles 55 by a crane 20. The crane 20 positions the panels 50 into a partially constructed field assembly jig 80, where the panels 50 are assembled into sections 90. FIG. 9 shows a completed section 90. The crane 20 positions the sections 90 on a foundation 35 for the tower structure 100.

The frame members 70 assist in assembly of the panels 50 into the sections 90. The crane 20 or other lift may grasp the frame member 70 in order to move the panels 50. As such, the crane 20 is not directly touching the panels 50 and damage to the panels 50 during the construction and assembly of the sections 90 may be reduced. After construction of the sections 90, the frame members 70 are removed from the sections 90 and returned to the factory for reuse on other panels 50.

The panels 50 are positioned in the field assembly jig 80, which provides support for the panels 50 via the frame members 70 as the panels 50 are assembled into the section 90 of the tower structure 100. The field assembly jig 80 includes ground support wings 110. The ground support wings 110 provide support for the base components of the field assembly jig 80. The ground support wings 110 connect or attach to the frame members 70 to assist in positioning the panels 50 as the panels 50 are formed into the section 90. As the panels 50 are assembled on the field assembly jig 80 during the assembly of the section 90, upper support wings 120 are added to the frame members 70 in order to assist in completion of the section 90. The upper support wings 120 further receive another frame member 70 during the formation of the section 90. As such, the frame members 70, the ground support wings 110, and the upper support wings 120 form the jig assembly 80.

The panels 50 are assembled together in the field assembly jig 80 via a vertical connection 200. After the section 90 is completed, the crane lifts the section 90 onto the foundation 35 for the tower structure 100 or onto a previously completed section 90. The plurality of sections 90 are stacked on each other and are fastened or secured together via a horizontal connection 400. The sections 90 generally taper in diameter as the sections 90 build to a top of the tower structure 100.

Figure 10:
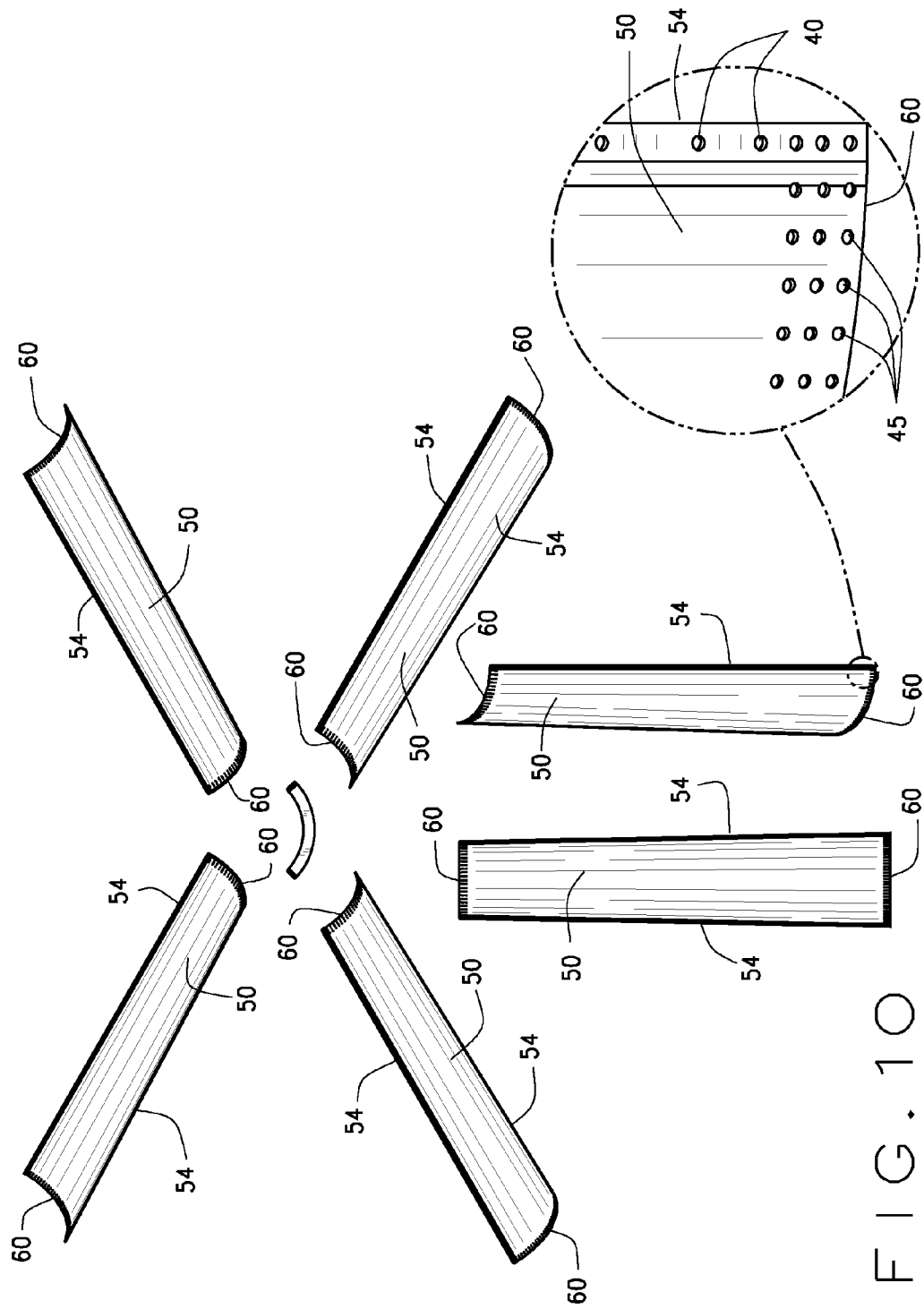
FIG. 10 shows a view of the panel.

The panels 50 generally have a curved or arcuate shape, and, as such, a plurality of the panels 50 form the generally circular section 90. With reference to FIG. 10, the panels 50 have vertical edges 54 that join with the vertical edges 54 of adjacent panels 50 during the assembly of the section 90. The panels 50 have top and bottom horizontal edges 60, that form top and bottom edges of the section 90. As described herein, certain portions of the panels 50 may have a planar section near the vertical edges 54 to facilitate connection to adjacent panels 50.

The panels 50 are up to approximately 50 feet in length with a width of less than approximately 12 feet. The panels 50 may be constructed with longer lengths, if required. For example, approximately 18 to approximately 20 panels 50 may be used in construction of an 80 meter tower structure 100, while approximately 32 to approximately 36 panels 50 may be used in construction of a 100 meter tall tower structure 100. The exact number of panels 50 for any given tower design is dependent upon the specific engineering and manufacturing requirements for individual tower application. For a typical 80 meter tower structure 100, the panels 50 are formed into approximately five sections 90 that are stacked on top of each other and joined to form the tower structure 100, while approximately seven sections 90 are stacked on top of each other and joined to form the 100 meter tower. Additional sections 90, such as eight to twelve sections 90, and additional panels 50 may be utilized to increase the diameter of the tower structure 100 and/or the height of the tower structure 100. Fewer sections 90 and fewer panels 50 may also be utilized in a lower tower structure 100.

The panels 50 have a thickness of approximately ⅜ inches to approximately 1½ inches. The thickness of the panels 50 will vary depending on the intended height of the tower structure 100, as well as the vertical position of the panel 50 in the tower structure 100.

Figure 11:
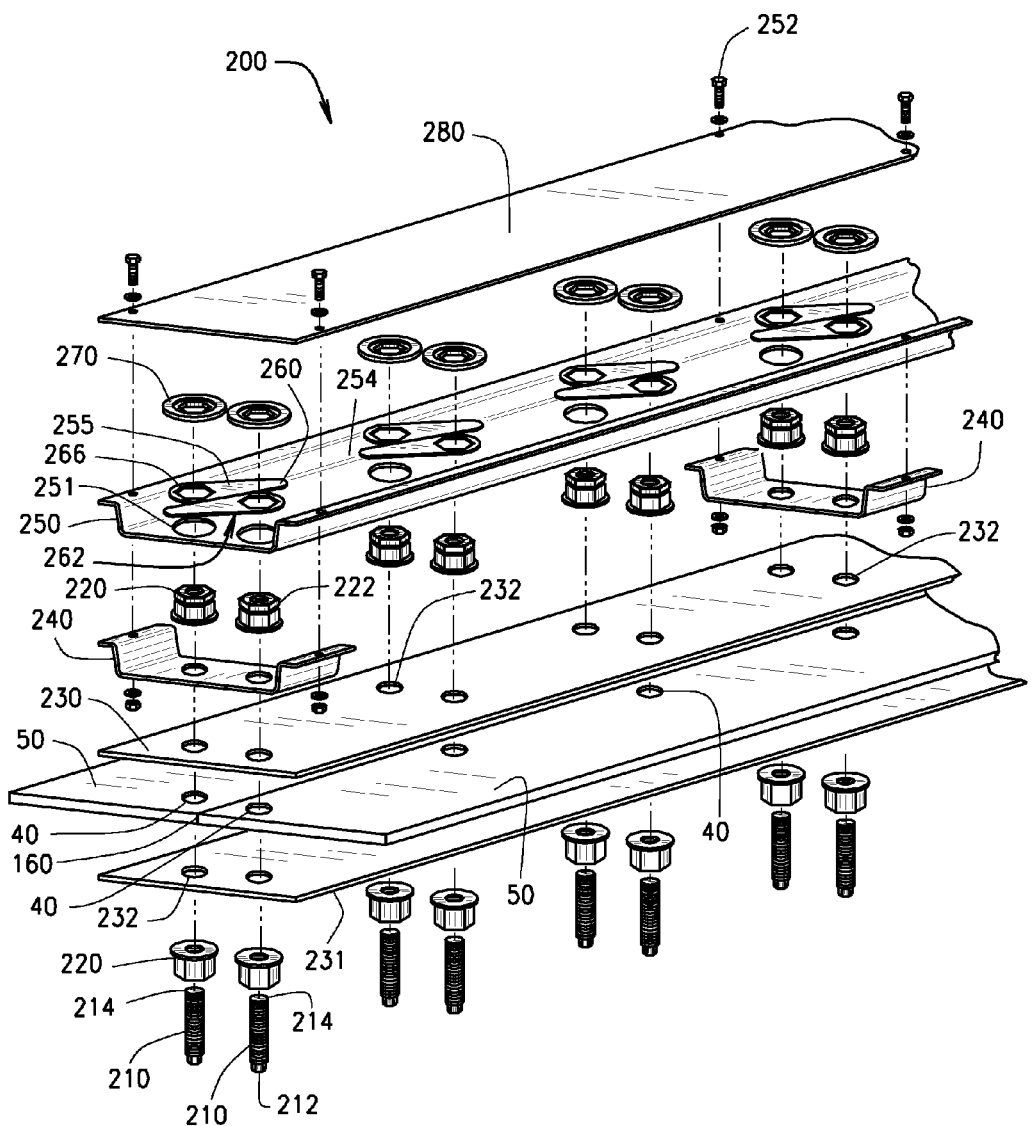
FIG. 11 shows an exploded view of the first embodiment of the vertical connection that connects or secures the panels together.

As the panels 50 are assembled in the field jig assembly 80, the vertical connection 200 secures adjacent panels 50. A first embodiment of the vertical connection is shown in FIG. 11 as the vertical connection 200. The vertical connection 200 covers a seam 160 between the vertical edges 54 of adjacent panels 50 and secures the vertical edges 54 of the adjacent panels 50 in a friction or slip critical connection.

The panels 50 comprise a plurality of holes 40 bored therethrough along the vertical edges 54 of the panels 50. The panels 50 may form a non-curved or planar portion at the vertical edge 50 in order to receive the vertical connection 200. The threaded stud 210 passes through the holes 40 such that a first end 212 of the threaded stud 210 is on the interior side of the panel 50 and a second end 214 of the threaded stud 210 is on the exterior side of the panel 50 on the exterior side of the panel 50. A flange nut 220 receives the threaded stud 210 which has passed through an exterior vertical friction plate 230. The threaded stud 210 receives a flange nut 220 on the interior side of the panel 50 over an interior vertical friction plate 231. The flange nut 220 on the interior side of the panel 50 may be replaced with a conventional heavy hex nut.

The vertical friction plates 230 and 231 comprise a plurality of holes 232 corresponding to the holes 40 in the panel 50 and are installed on the threaded studs 210 on both the interior and the exterior sides of the panel 50. On the interior side of the panel 50, the flange nut 220 or heavy hex nut is securely tightened to the threaded stud 210 on top of the interior vertical friction plate 231. On both the interior and exterior sides of the panel 50, the vertical friction plates 230 and 231 are positioned over the seam 160 between the adjacent panels 50. The vertical friction plates 230 and 231 cover the seam 160. Next, on the exterior side of the panel 50, a support plate 240 is placed over the threaded studs 210. Next, a tray plate 250 comprising a plurality of openings 251 that accept the flange nuts 220 is placed on the support plate 240. The base plate 250 is secured to the support plate 240 via screws 252.

Anti-rotation nut tabs 255 are placed over the flange nuts 220 on the exterior side of the panel 50. The anti-rotation nut tabs 255 prevent the tightened flange nuts 220 from turning during assembly as an extending end 260 of the anti-rotation nut tab 255 contacts an adjacent flange nut 220. The anti-rotation nut tabs 255 include an opening 266 that fits over or engages the flange nuts 220. A bottom surface 262 of the anti-rotation nut tab 255 is supported against a top surface 254 of the tray plate 250. The flange nut 220 may be provided with a groove 222 that receives a snap ring 270. The snap ring 270 may comprise a plastic washer or other snap fitting that urges or holds the anti-rotation nut tab 255 onto the flange nut 220.

A cover plate 280 is attached to the tray plate 250 via screws 252 or other fasteners. The cover plate 280 provides the flange nuts 220 and anti-rotation nut tabs 255 with protection from the elements. The cover plate 280 further provides improved aesthetic appearance to the completed tower structure 100. The cover plate 280 is not required for the for functionality of the vertical connection 200.

The vertical connection 200 extends over most of or the entire length of the seam 160 between adjacent panels 50. During installation, the exterior portions of the vertical connection 200 may be partially installed on several of the panels 50, while the internal portions of the vertical connection 200 may be installed on other panels 50. Certain panels 50 may receive the external portions of the vertical connection 200 on both of their vertical edges 54. As such, much of the assembly labor is conventionally and economically performed at the factory.

Figure 12:
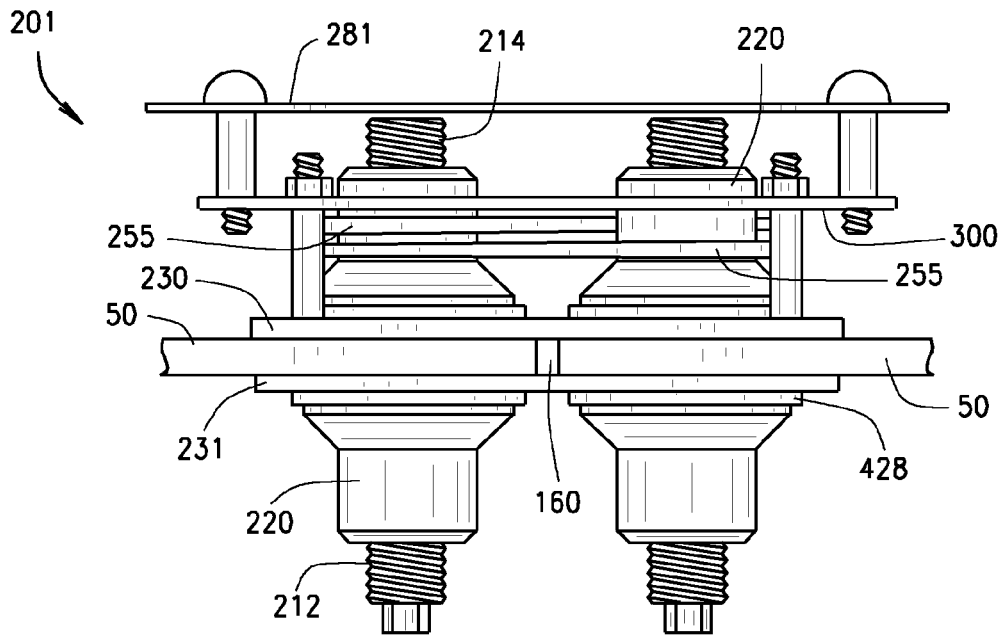
FIG. 12 shows a sectional view of the second embodiment of the vertical connection that connects or secures the panels together.

Another embodiment of the vertical connection is shown in FIGS. 12 and 13 as a vertical connection 201. The vertical connection 201 also forms a slip critical or friction connection between the adjacent panels 50.

The vertical connection 201 utilizes a stop plate 300. The stop plate 300 comprises a plurality of openings 310 that fit over or engage the flange nuts 220 on the exterior side of the panel 50 and secure the flange nuts 220 from rotating. Similar to the vertical connection 200, the interior friction plate 231 and the exterior friction plate 230 covers the seam 160 between the panels 50. The anti-rotation nut tabs 255 are positioned on the flange nuts 220 between the exterior friction plate 230 and the stop plate 300. The stop plate 300 and the exterior friction plate 230 prevent the anti-rotation tabs 255 from falling from the vertical connection 201 during assembly. A cover plate 281 is attached to the stop plate 300.

Figure 14:
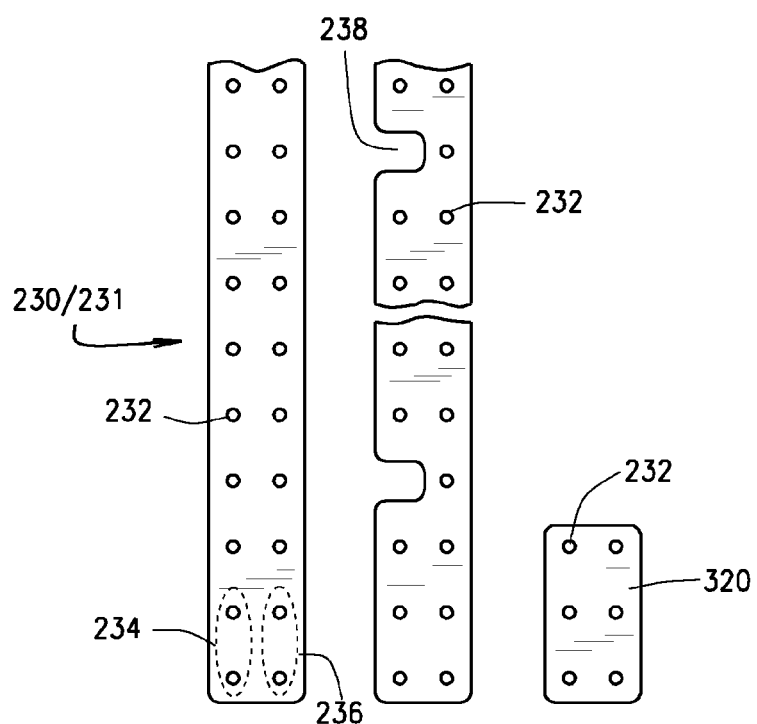
FIG. 14 shows the exterior and interior vertical friction plates.

The interior and exterior vertical friction plates 231 and 230 are shown in FIG. 14. The vertical friction plates 230 and 231 provide a linear member that covers the seam 160. The vertical friction plates 230 and 231 are made of steel or other rigid metal or metal alloy. The vertical friction plates 230 include a plurality of holes 232 that are oppositely disposed such that a first set 234 of the oppositely disposed holes 232 are used to connect to a first panel 50 and a second set 236 of the oppositely disposed holes 232 are used to connect to a second panel 50. The holes 232 correspond to the holes 40 in the vertical edge 54 of the panels 50. In the embodiment shown, the first set of holes 234 form a column of holes 232 opposite a column of holes 232 of the second set 236.

Certain sections of the vertical friction plates 230 and 231 are provided with a cutout area 238 that allows the vertical friction plates 230 to fit over pre-installed studs 210. The cutout areas 238 are filled with a washer tab 239. Further, a saddle plate 320 is placed over the exterior friction plate 230 in the vicinity of the cutout areas 238 to provide needed support.

Figure 15:
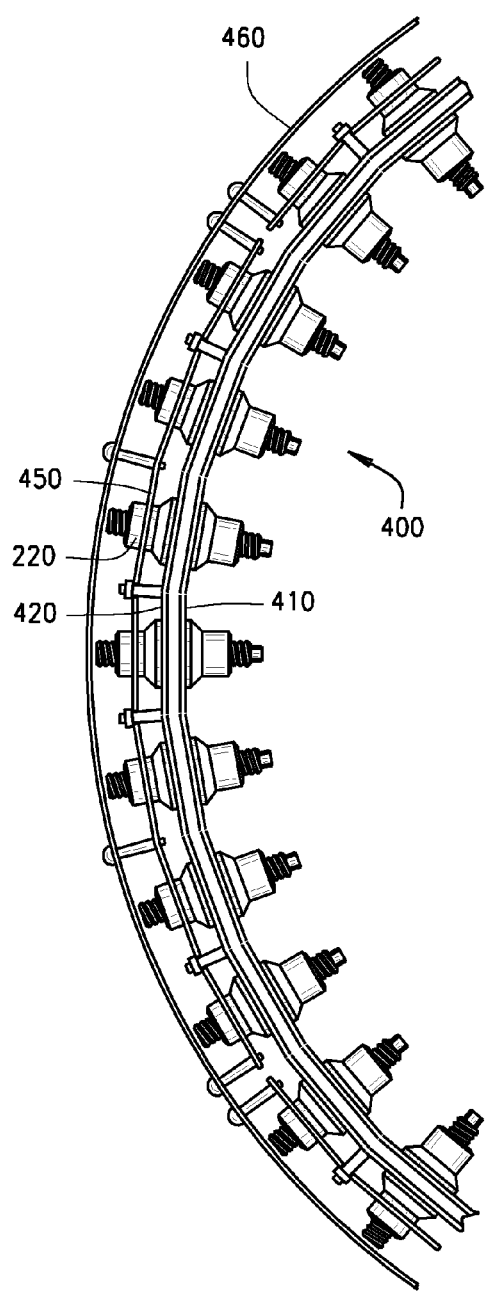
FIG. 15 shows a top down view of the horizontal connection.
Figure 16:
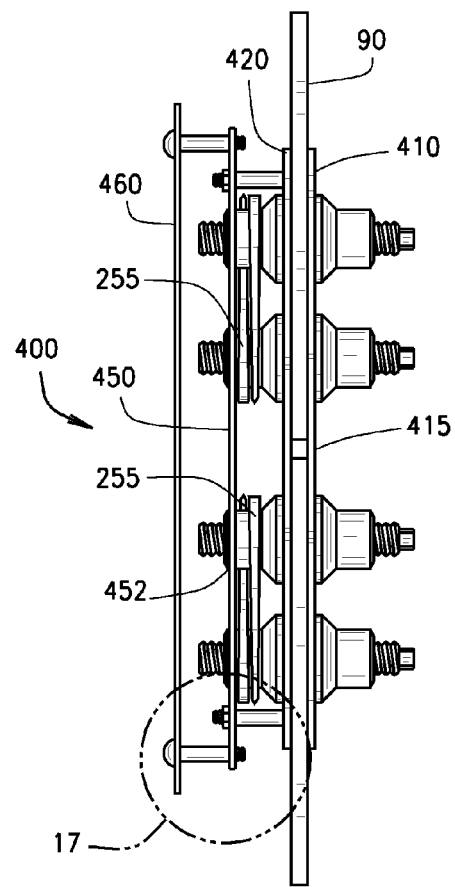
FIG. 16 shows a sectional view of the horizontal connection.
Figure 17:
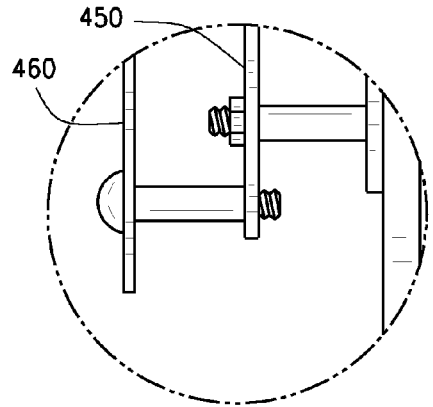
FIG. 17 shows a detailed view of the attachment of the cover plate to the horizontal connection.
Figure 18:
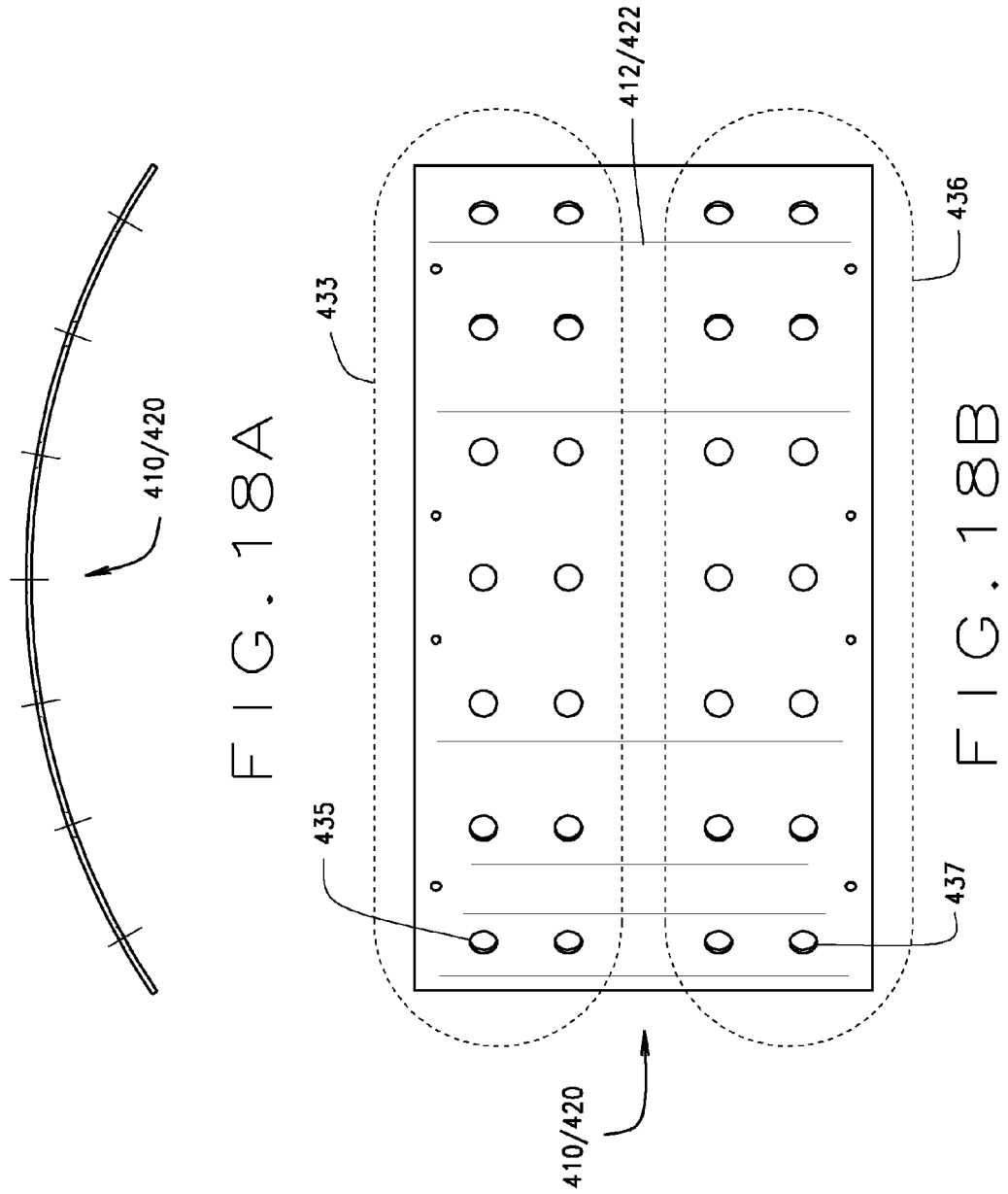
FIG. 18(a) shows a side view of the friction plate for the horizontal connection.
FIG. 18(b) shows a top view of the friction plate for the horizontal connection.

A horizontal connection 400 will now be described. The horizontal connection 400 is shown in FIGS. 15-17. The horizontal connection 400 connects or secures a first section 90 to adjacent sections 90 above or below the first section 90. The horizontal connection 400 forms a slip critical or friction connection between the adjacent sections 90. Typically, a first lower section 90 is connected or secured to a second section 90 placed on top of the first lower section 90 before a third higher section 90 is placed on the second section 90. The plurality of the sections 90 build the height of the tower structure 100.

An interior friction plate 410 covers an interior side of a seam 415 between the adjacent sections 90, while an exterior friction plate 420 covers an exterior side of the seam 415 between the adjacent sections 90. Both the interior friction plate 410 and the exterior friction plates 420 have a curved shape to correspond to the curved surface of the section 90, which has the generally circular shape. The interior and exterior friction plates 410 and 420 are made of steel or other rigid metal or metal alloy.

The interior friction plate 410 and the exterior friction plate 420 include a first set 433 of a plurality of holes 435 and a second set 436 of a plurality of holes 437. For example, the first set 433 of the plurality of holes 435 are used to attach to an upper section 90, and the second set 436 of plurality holes 437 are used to connect to a lower section 90. A solid region 412 of the interior friction plate 410 covers the interior side of the seam 415. A solid region 422 of the exterior friction plate 420 covers the exterior side of the seam 415. The solid regions 412 and 422 separate the first set 433 of the plurality of holes 435 from the second set 436 of the plurality of holes 437.

The threaded studs 210 pass through holes 45 in the horizontal edges 60 of the panels 50. The first end 212 of the threaded stud 210 is on the interior side of the section 90 and the second end 214 of the threaded stud 210 is on the exterior side of the section 90. The first end 212 of the threaded stud 210 receives the flange nut 220 on the inside of the section 90 over the interior friction plate 410. A washer 428 may be employed between the flange nut 220 and the interior friction plate 410.

On the exterior side of the section 90, the second end 214 of the stud 210 is secured to an additional flange nut 220. The anti-rotation nut tabs 255 are placed over the flange nuts 220. Next, a stop plate 450 is placed over the flange nuts 220 to prevent the flange nuts 220 from falling away. The stop plate 450 comprises a plurality of openings 452 that fit over or engage the flange nuts 220. A cover plate 460 is attached to the stop plate 450 to provide protection to the horizontal connection number 400, as well as provide and more aesthetically pleasing appearance.

The vertical connections 200 and 201 and the horizontal connection 400 provide a slip critical or friction connection between the adjacent panels 50 and the adjacent sections 90. The pressing of the interior friction plate 231 and exterior friction plate 230 of the vertical connections 200 and 201 and the pressing of the interior friction plate 410 and the exterior friction plate 420 of the horizontal connection 400 transfer the load through the panels 50 and the sections 90. Essentially, when fully assembled the vertical connection 200 and the horizontal connection 400 result in a one-piece tower structure 100. The load of the tower structure 100 and a turbine is not transferred through the threaded studs 210. The load from the tower 100 and the turbine are transferred from the panels 50 of the upper sections 90 to the panels 50 of the lower sections 90 through the various frictions plates 230, 231, 410, and 420. This slip critical or friction connection results in greatly reduced fatigue on the individual components of the tower structure 100, as compared to the other convention tubular steel tower designs. The reduced fatigue characteristics resulting from these connections allows for a more efficient and therefore more economical use of material in the overall tower design.

Importantly, the threaded stud 210 utilizes two flange nuts 220 or one flange nut 220 on the exterior side and one heavy hex nut on the interior side. As such, as the flange nuts 220 or heavy hex nuts are tightened on the first and second ends 212 and 214 of the threaded stud 210, and little or no rotational force is loaded onto the threaded stud 210. The use of the two flange nuts 220 is an improvement over a conventional arrangement using a bolt and a single nut, since a rotational force or load is applied on the bolt that tends to want to relax to an untorqued state.

As described above, the panels 50 are provided in shipping bundles 55 to ease in loading, transportation, unloading, and assembly. The shipping bundles 55 are easily loaded and unloaded using a two-point lifting arrangement. The frame members 70 assist in the stacking of the panels 50 into the shipping bundles 55.

The frame members 70 also assist in the assembly of the panels 50 in the sections 90. The frame members 70 form an integral part of the field assembly jig 80, as the frame members 70 are connected to the ground support wings 110 and the upper support wings 120. Moreover, the frame members 70 are removed from the completed section 90 and returned to the factory or manufacturer for reuse on further panels 50.

A fastener pack 500 is shown in FIGS. 19-29. The fastener pack 500 may be used in fastening together the panels 50 and sections 90 herein described, as well as connecting the seams of other mechanical structures. The fastener pack 500 may be used in forming a horizontal connection 401 and a vertical connection 202 as shown in FIG. 29. The fastener pack 500 may be used on either or both of the interior and exterior sides of the modular tower 100. The fastener pack 500 may be used with the vertical friction plates 230 and 231, as well as with the horizontal friction plates 410 and 420.

The fastener pack 500 generally includes a fastener tray 510, anti-rotation nut tabs 600, and a position cover 700. The fastener pack 500 attaches or connects to the threaded studs 210 that are connecting the vertical edges 54 of the panels 50 or the horizontal edges 60 of the sections 90. The anti-rotation nut tab 600 prevents the flange nut 220 from rotating when the flange nut 220 on an opposite end of the threaded stud 210 is tightened. The position cover 700 holds the anti-rotation nut tabs 600 and the flange nuts 220 in position in the fastener tray 510, such that the flange nuts 220 are aligned to receive the threaded studs 210.

Figure 19:
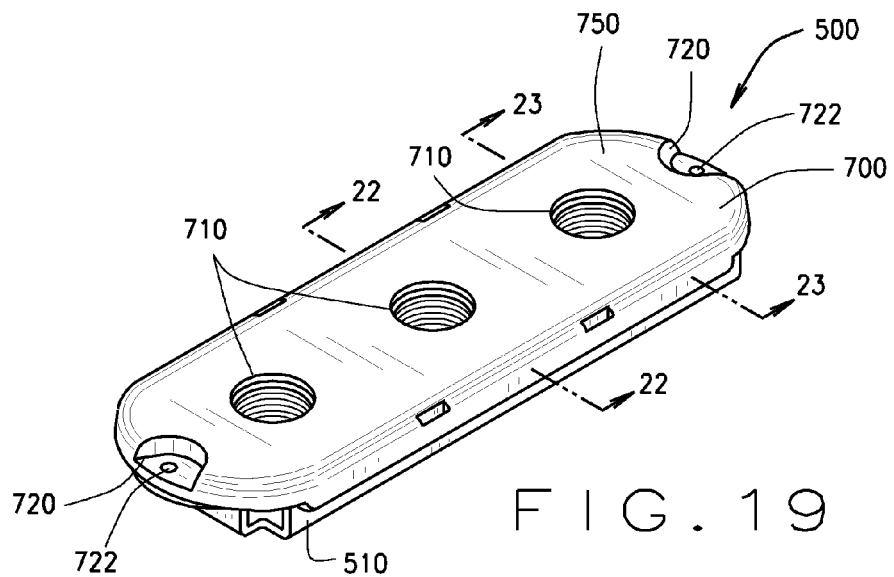
FIG. 19 shows a perspective view of the fastener pack.

The fastener tray 510 will now be described in detail with reference to FIGS. 19-21. The fastener tray 510 defines an interior 515 that receives the flange nuts 220 and the anti-rotation nut tabs 600. The fastener tray 510 includes a first end wall 530 opposite of a second end wall 540. The fastener tray 510 further includes a first side wall 550 opposite of a second side wall 560. The combination of the first end wall 530, the second end wall 540, the first side wall 550, and the second side wall 560 generally form a rectangular or box-like structure to receive the flange nuts 220 and the anti-rotation nut tabs 600. The position cover 700 covers a top opening of the fastener tray 510.

The fastener tray 510 further includes a bottom wall 520. The bottom wall 520 includes a plurality of fastener openings 526. The threaded stubs 210 pass into the fastener tray 510 through the fastener openings 526. The bottom wall 520 further includes a top surface 522 and a rear surface 524. The rear surface 524 may be placed against the surface of the panels 50, the surface of the sections 90, any of the various friction plates herein described, or other surfaces involved in a joint or connection.

The first end wall 530 of the fastener tray 510 includes a flange portion 532 that defines an opening 534. Likewise, the second end wall 540 of the fastener tray 510 includes a flange portion 542 that defines an opening 544. The openings 534 and 544 are used to connect with the position cover 700. For example, a fastener may pass through the openings 534 and 544 and the position cover 700 to mechanically join the position cover 700 with the fastener tray 510.

Figure 26:
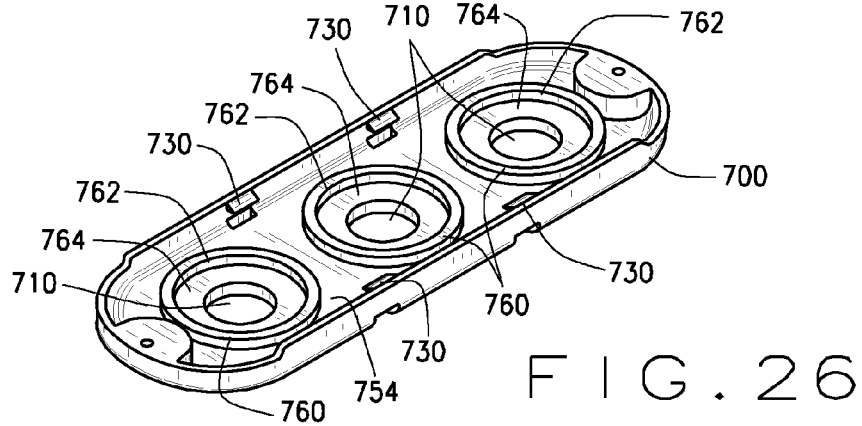
FIG. 26 shows a perspective view of the position cover.

The first side wall 550 includes a catch member receiving portion 552. Likewise, the second side wall 560 includes a catch member receiving portion 562. The catch member receiving portions 532 and 562 may include any of a variety of slots, openings, detents, grooves, flanges, etc. that allow the fastener tray 510 to connect or engage with the position cover 700. As shown in FIG. 26, the position cover 700 includes a catch member 730 that engages or connects with the catch member receiving portion 552 and 562. This engagement or connection allows the position cover 700 to snap fit to the fastener tray 510, which holds the flange nuts 220 in position to receive the threaded studs 210.

Figure 20:
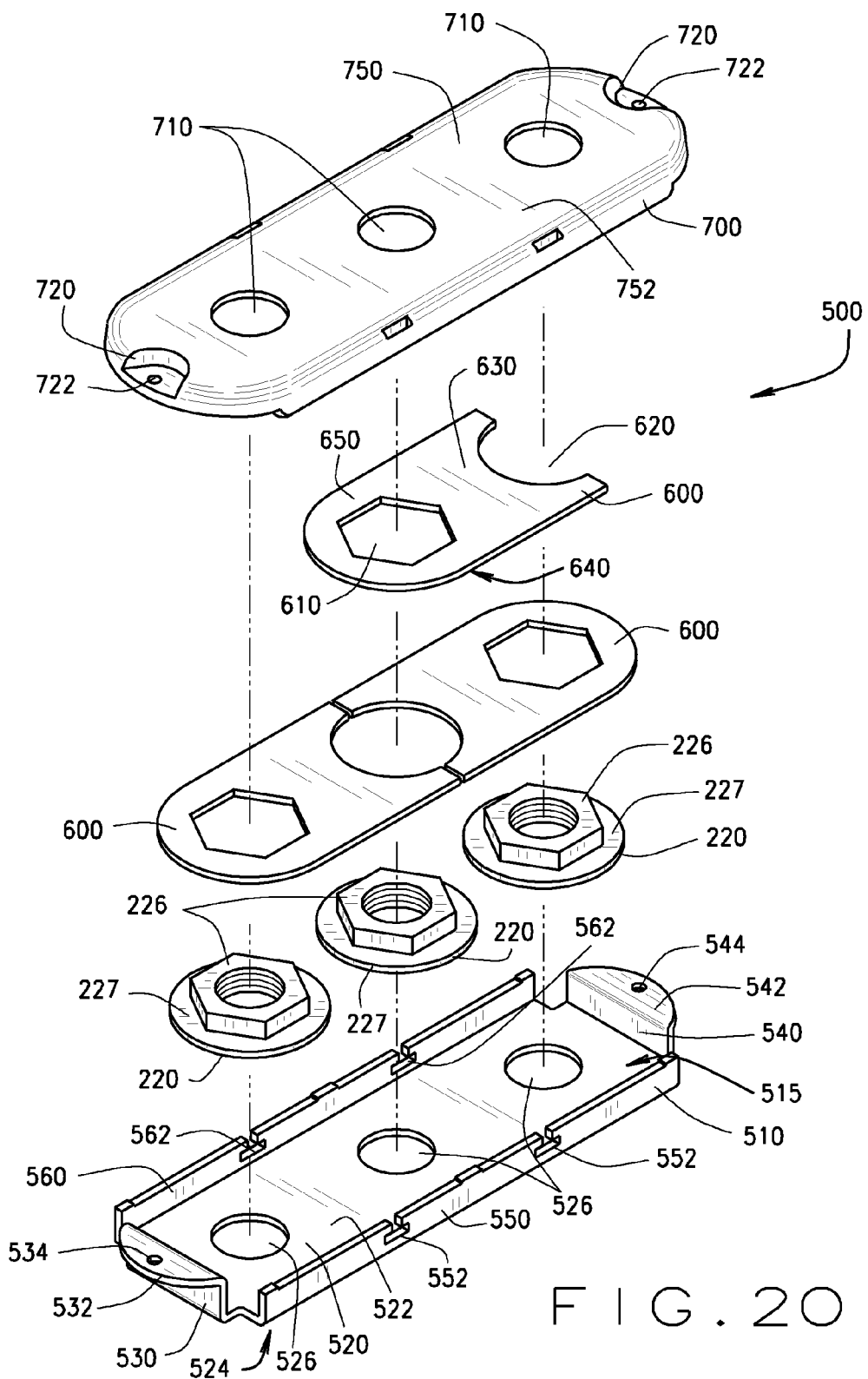
FIG. 20 shows an exploded view of the fastener pack.
Figure 22:
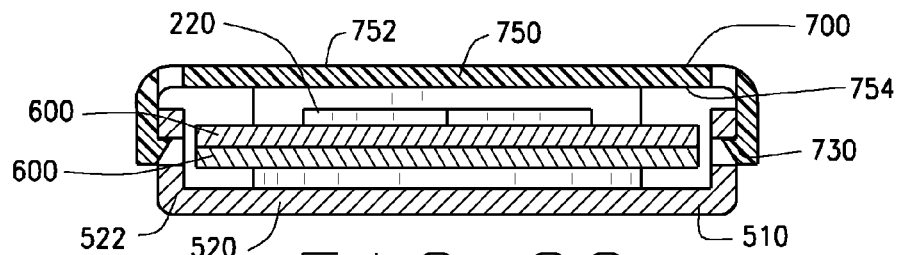
FIG. 22 shows a sectional view of the fastener pack.
Figure 23:
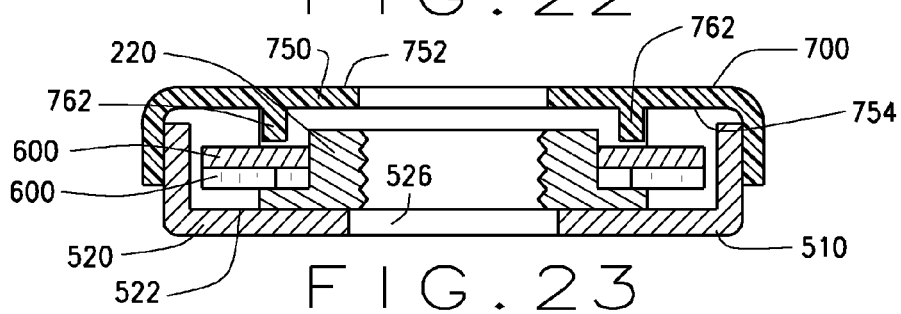
FIG. 23 shows another sectional view of the fastener pack.
Figure 24:
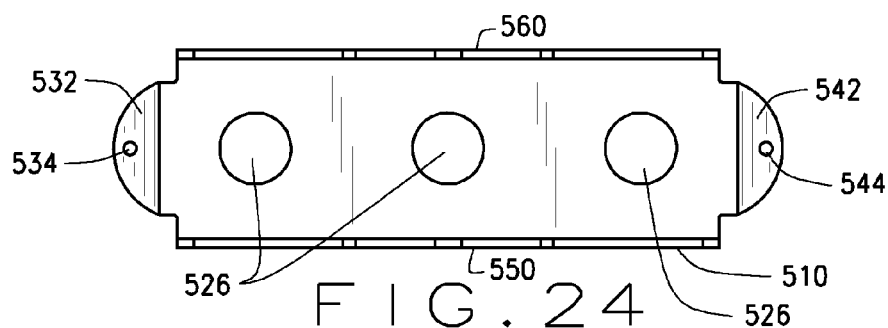
FIG. 24 shows a top view of the fastener tray.
Figure 25:
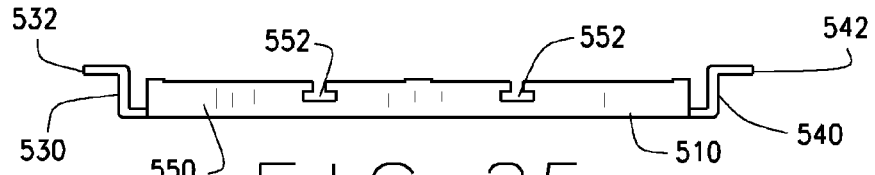
FIG. 25 shows a side view of the fastener tray.

With reference to FIG. 20, the flange nut 220 includes a nut portion 226 and a washer portion 227. The flange nut 220 may be a conventional, commercially available flange nut. The washer portion 227 has a larger diameter than the nut portion 226. The nut portion 226 includes a conventional hexagonal design. When positioned, the washer portion 227 of the flange nut 220 lies flush against the top surface 522 of the bottom wall 520 of the fastener tray 510. When fastening the fastener pack 500 to the threaded studs 210, a first end 212 of the threaded stud 210 passes through the fastener opening 526 into the interior 515 of the fastener tray 510. The flange nut 220 is threadably engaged to the first end 212 of the threaded stud 210. Additional threaded studs 210 are passed through the fastener openings 526 into the interior 515 of the fastener tray 510. Additional flange nuts 220 are threadably engaged to these threaded studs 210.

As shown in FIG. 20, the anti-rotation nut tabs 600 are placed over the nut portions 526 of the flange nuts 220. The anti-rotation nut tabs 600 lock the flange nuts 220 into place. As such, the anti-rotation nut tabs 600 prevent the flange nuts 220 from loosening and hold the flange nuts 220 steady when a further flange nut 220 is tightened on an opposite end of the threaded stud 210.

The anti-rotation nut tabs 600 are shown in FIG. 20. The anti-rotation nut tabs 600 may include a full nut opening 610 and a partial nut opening 620. The full nut opening 610 engages the nut portion 226 of a first flange nut 220. The partial nut opening 620 engages a second or adjacent flange nut 220 to prevent the first flange nut 220 from rotating. The partial nut opening 620 braces against the second flange nut 220 to prevent the first flange nut 220 from rotating.

The full nut opening 610 is positioned opposite of the partial nut opening 620. A middle portion 630 integrally joins the full nut opening 610 and the partial nut opening 620. The anti-rotation nut tab 600 includes a bottom surface 640 and a top surface 650. The bottom surface 640 and the top surface 650 include a generally planer or flat surface. As shown in FIG. 26, a first anti-rotation nut tab 600 lies parallel to the top surface 522 of the fastener tray 510, i.e., the bottom surface 640 of the anti-rotation nut tab 600 lies parallel against the top surface 522.

The partial nut opening 620 may include a semi-circular, half-moon, or other shape that frictionally or positionally engages the nut portion 226 of the flange nut 220. The semi-circular or half-moon shape allows the partial nut openings 622 to fit the nut portion 226 without having to have the nut portion 226 perfectly or exactly aligned with the partial nut opening 620. If the partial nut opening 620 is half of a hexagon shape, then the partial nut opening 620 must be exactly aligned with the nut portion 226 to engage the nut portion 226. However, by including the half-moon or semi-circular shape to the partial nut opening 620, greater flexibility is achieved.

As shown in FIG. 20, the fastener tray 510 includes three of the fastener openings 526. As such, the fastener tray 510 may receive three threaded studs 210 that are engaged by three flange nuts 220 and three anti-rotation nut tabs 600. In other aspects, the fastener tray 510 may include two to six fastener openings 526, two to six flange nuts 220, and two to six threaded studs 210.

Figure 21:
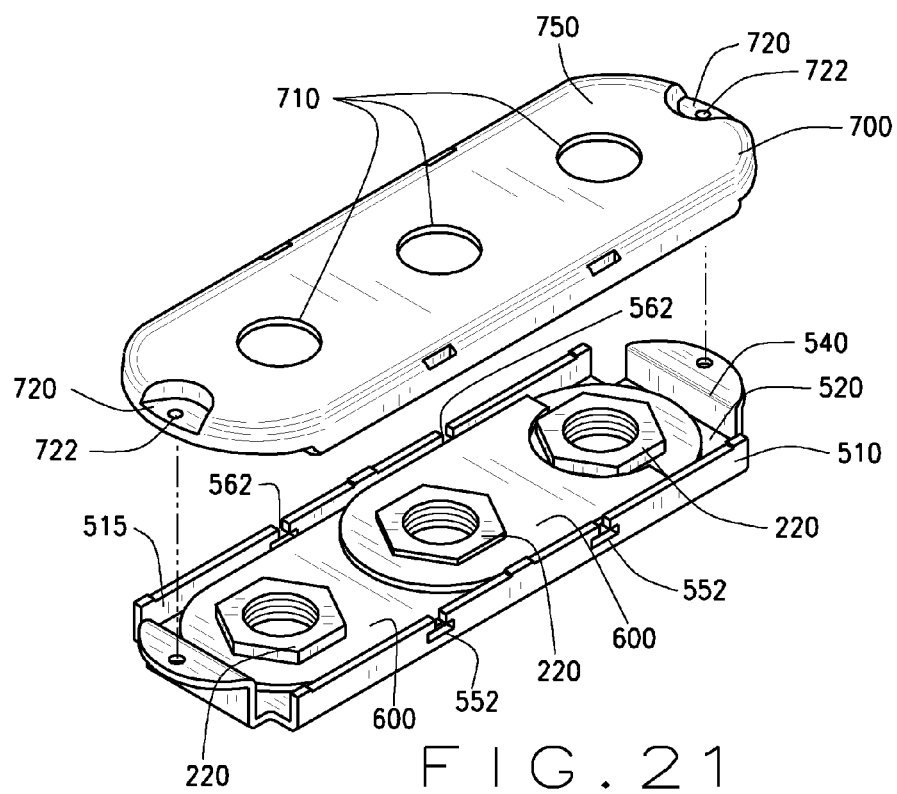
FIG. 21 shows a perspective view of the fastener pack with the position cover removed from the fastener tray.

As shown in FIG. 21, the first anti-rotation nut tab 600 engages the first flange nut 220 with its full nut opening 610. The partial nut opening 620 of the first anti-rotation nut tab 600 engages the second flange nut 220. A second anti-rotation nut tab 600 engages its full nut opening 610 to the second flange nut 220, and the partial nut opening 620 of the second anti-rotation nut tab 600 engages a third flange nut 220. A third rotation nut tab 600 engages its full nut opening 610 to the third flange nut 220, and the partial nut opening 620 of the third anti-rotation nut tab 600 engages to the second flange nut 220. As such, the partial nut openings 620 of the first and third anti-rotation nut tabs 600 are engaging the second flange nut 220. This creates an interlocking system to maintain the flange nuts 220 in proper, tightened positions.

As shown in FIG. 21, the fastener tray 510 receives the position cover 700. The position cover 700 positions the flange nuts 220 and the anti-rotation nut tabs 600 in the correct position such that the fastener pack 500 may be fully assembled and then positioned on the panels 50, sections 90, or friction plates to receive the threaded studs 210. As such, the fastener packs 500 may be fully assembled at a shop or factory and brought to the field in the fully assembled position. This reduces installation labor in the field.

The position cover 700 includes a top wall 750 that encloses the fastener pack 500. The top wall 750 includes a plurality of nut openings 710. The position cover 700 defines an interior 740 that partially or fully contains the flange nuts 220. The top wall 750 includes a top surface 752 and a lower surface 754.

A plurality of cylindrical members 760 extend from the lower surface 754 of the top wall 750 toward the bottom wall 520 of the fastener tray 510. The cylindrical member 760 includes walls 762 that define a recess 764 that receives the flange nuts 220. The recess 764 has an internal diameter large enough to hold the flange nut 220 and position the flange nut 220 correctly such that the flange nut 220 will align with the threaded studs 210. The corners of the hexagonal shape of the nut portion 226 should just fit inside the cylindrical member 760. The cylindrical members 760 may extend from the lower surface 764 an approximate distance to cover a portion of the depth of the flange nut 220.

The position cover 700 further includes recessed end portions 720 that define fastener openings 722. The recessed end portions 720 engage to the flange portions 532 and 542 of the fastener tray 510. Further, the position cover 700 includes catch members 730 that engage the catch member receiving portions 552 and 562. The position cover 700 may snap fit to the fastener tray 510.

Figure 27:
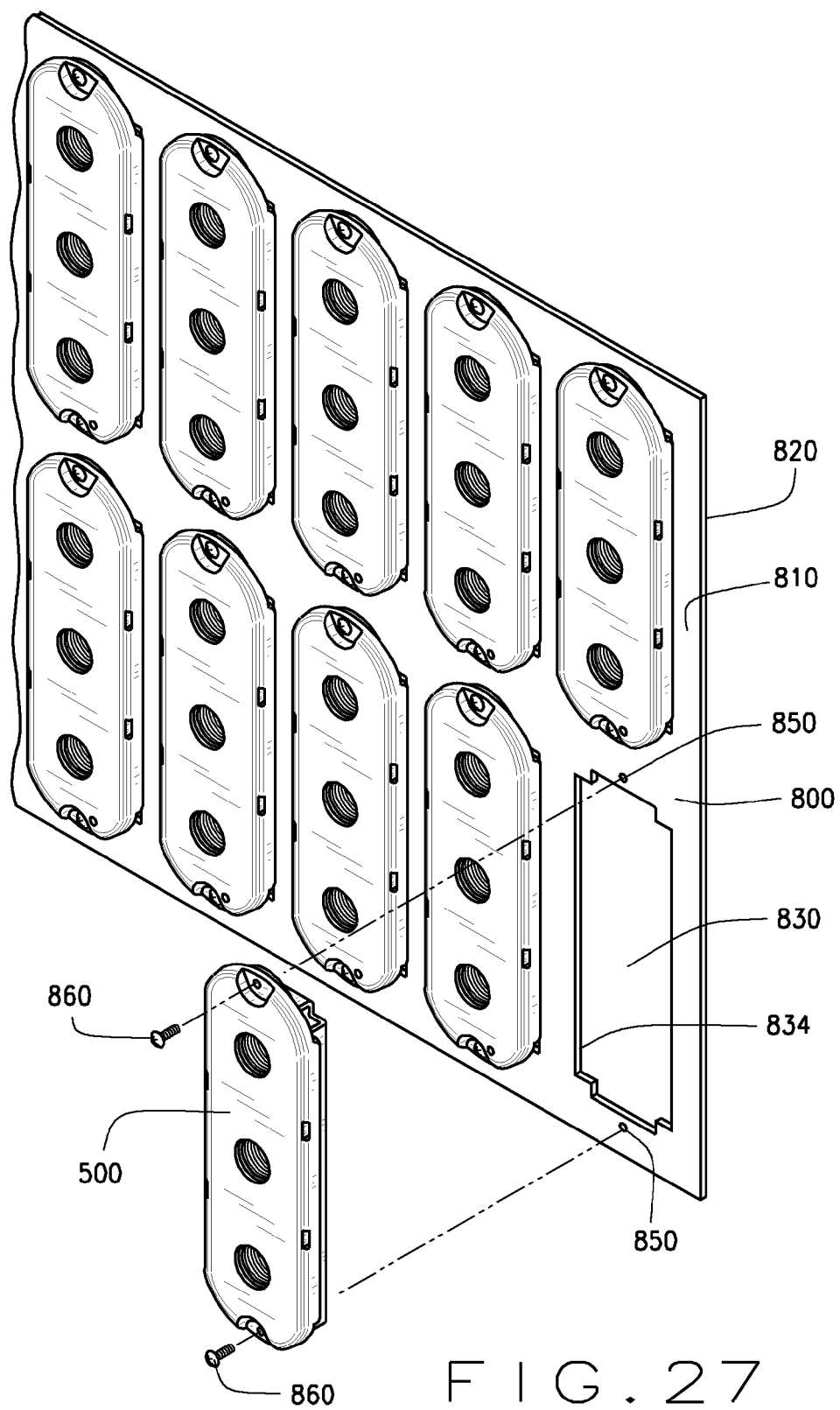
FIG. 27 shows a view of the fastener pack and tray.

With reference to FIG. 27, the fastener pack 500 may be used with or without a tray positioner 800. The tray positioner 800 is useful for installing sections 90 on top of additional sections 90 as the modular tower 100 is being constructed. As this step of the construction of the modular tower 100 is often performed at an elevated level, any reduction in labor results in efficiency. The tray positioner 800 positions the fastener packs 500 at the appropriate locations such that the fastener packs 500 will be aligned with the threaded studs 210 passing through the holes 40 and 45 of the panels 50.

Figure 28:
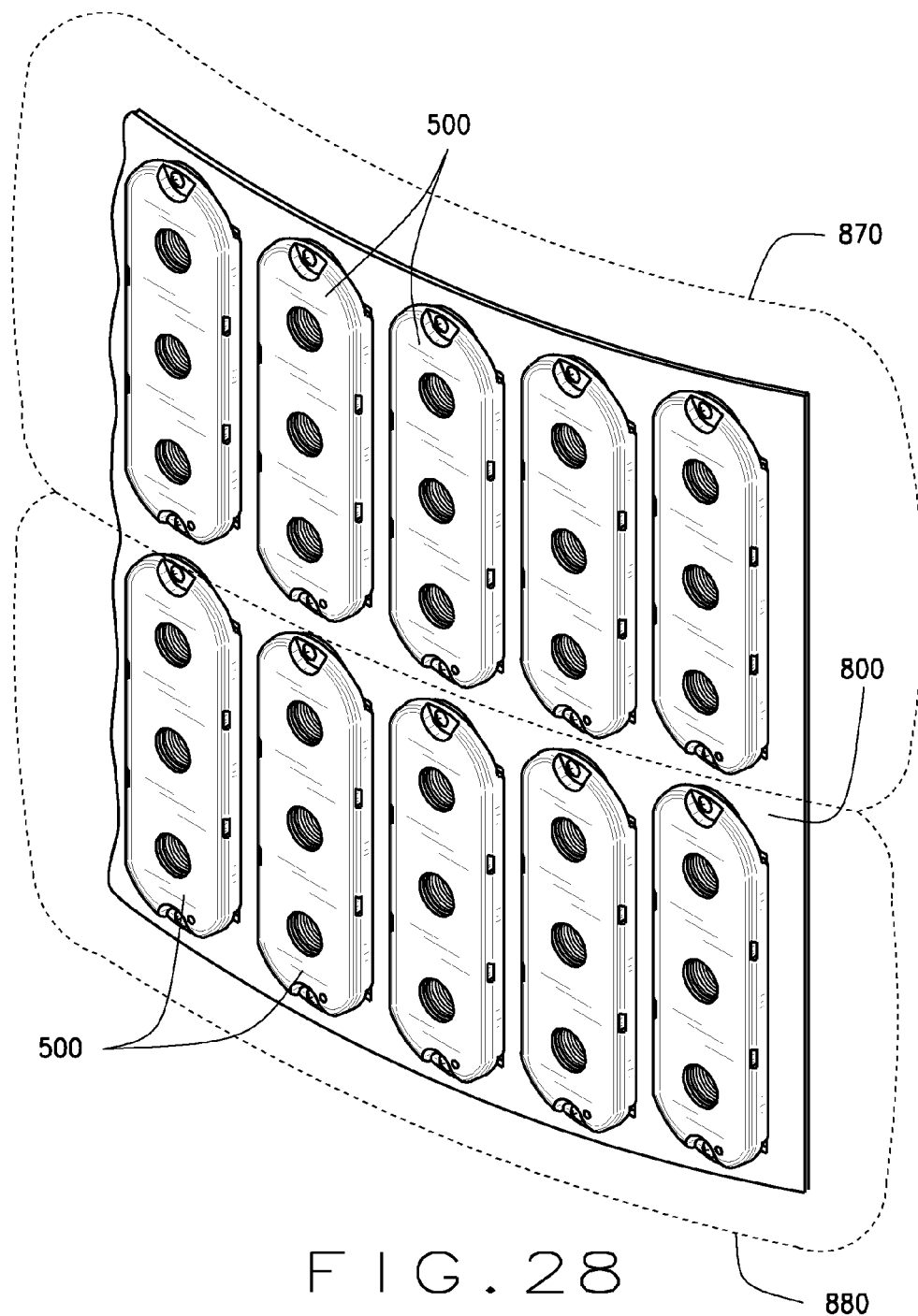
FIG. 28 shows a view of the fastener pack and tray.

The tray positioner 800 is typically formed from a thin gage, flat material that allows that allows the tray positioner 800 to match the curvature of the tower 100. As shown in FIG. 28, the tray positioner 800 flexes or bends to match or conform to the sections 90. The tray positioner 800 is generally positioned flush against the exterior surface of the sections 90. Before the tray positioner 800 is installed, the tray positioner 800 may have a generally flat or planar orientation. In some aspects, the tray positioner 800 may be pre-bent or formed with a curvature at the factory. The tray positioner 800 may be formed from a stainless steel sheet or other noncorrosive metal or metal alloy. The tray positioner 800 may have a thickness of approximately 18 gauge to approximately ⅛ inch, including 14 and 16 gauge materials.

The tray positioner 800 includes openings 830 that receive the fastener packs 500. The openings 830 define walls 834 that position the exterior surface of the fastener packs 500. The tray positioner 800 includes an upper surface 810 and a lower surface 820. The lower surface 820 is generally positioned against an exterior surface of the friction plate. The tray positioner 800 may include openings 850 that receive a mechanical fastener 860 that is passed through the fastener opener 722 of the position cover 700, as well as the openings 534 and 544 of the fastener tray 510. As such, each of the position cover 700 and the fastener tray 510 may be mechanically fastened to the tray positioner 800. The mechanical fastener 860 may include a machine screw, rivet, or other mechanical fastening device.

As shown in FIG. 28, the tray positioner 800 includes a first row 870 of fastener packs 500 and a second row 880 of fastener packs 500. The first row 870 of the fastener packs 500 engage to the holes 45 along the horizontal edge 60 of a section 90*a*. Meanwhile, the second row 880 of the fastener packs 500 engage to the holes 45 along the horizontal edge 60 of a different section 90*b*. The section 90*a* is above the section 90*b*. As the horizontal connection 401 connecting the sections 90*a* and 90*b* may be formed up in the air as the module tower 100 is constructed, the tray positioner 800 is useful to simultaneously position a number of the fastener packs 500.

In forming the horizontal connection 401, the tray positioner 800 and the fastener packs 500 are installed over the horizontal friction plates 410 and 420. The fastener packs 500 of the horizontal connection 401 are arranged generally perpendicular to the seam 415 between the sections 90. As shown in FIG. 29, the ends of the fastener packs 500 point toward the seam 415.

An example of the vertical connection 202 is shown in FIG. 29. The fastener pack 500 may be used with or without the tray positioner 800. The fastener packs 500 are generally installed over the vertical friction plates 230 and 231. In this aspect, the fastener packs 500 hold two flange nuts 220 in position. FIG. 29 shows use of the fastener packs 500 without the tray positioner 800. The fastener packs 500 are used to connect the vertical edges 50 of a pair of the panels 50. The fastener pack 500 may cross over the seam 160 between a pair of panels 50*a* and 50*b* with one of the treaded studs 210 in the panel 50*a* and the other threaded stud 510 in the panel 50*b*. Panels 50*c* and 50*d* form the section 90*b*. As such, the length of the fastener pack 500 may be generally aligned perpendicular to the seam 160 between the pair of panels 50. In other aspects, individual fastener packs 500 of the vertical connection 202 may be fully installed on one panel 50 opposite of another individual fastener packs 500 that is fully installed on another panel 50.

In some aspects, the tray positioner 800 may include approximately 6 to approximately 30 fastener packs 500. The tray positioner 800 may include approximately 12 to approximately 20 fastener packs 500 depending upon the application and size of the modular tower 100. The tray positioner 800 includes a generally rectangular shape of approximately two feet by approximately three to four feet. The tray positioner 800 may be formed from a single piece of treated steel. The tray positioner 800 further covers the seams between the panels 50 to prevent debris from entering the seam 160.

The quantity of the flange nuts 220 corresponds with the number of the fastener openings 526 in the fastener tray 510. The anti-rotation nut tabs 600 are placed on top of the flange nuts 220. When the anti-rotation nut tabs 600 are installed, they create an interlocking system that keeps the flange nuts 220 from being able to turn during tightening. For example, the partial nut opening 620 engages the adjacent flange nut 220 while the full nut opening 610 engages the first flange nut 220. The adjacent flange nuts 220 are used to prevent the first flange nut 220 from rotating.

The position cover 700 holds both the anti-rotation nut tab 600 from lifting off of the flange nuts 220 and holds the flange nuts 220 in the correct position. The position cover 700 snap fits to the fastener tray 510. The position cover 700 may be formed or molded from thermal plastic.

Those skilled in the art will appreciate that variations from the specific embodiments disclosed above are contemplated by the invention. The invention should not be restricted to the above embodiments, but should be measured by the following claims.

What is claimed is:

1. A connection for securing or connecting panels or sections together for a modular tower structure, the connection comprising:
   an interior friction plate having a plurality of holes;
   an exterior friction plate having a plurality of holes;
   threaded studs that pass through the holes in the interior friction plate, holes in the panels or section, and the holes in the exterior friction plate;
   a plurality of fastener packs, wherein the fastener packs comprise: a fastener tray, wherein a bottom wall of the fastener tray comprises a plurality of openings; a plurality of flange nuts; a plurality of anti-rotation nut tabs to engage the flange nuts; and, a position cover to position the flange nuts; and,
   a first flange nut is engaged to a first end of one of the threaded studs, a first fastener pack prevents the first flange nut from rotating while a second flange nut threadably engages to a second end of the threaded stud.

2. The connection according to claim 1, wherein the threaded studs pass into the fastener tray through the openings, and the flange nuts threadably engage to ends of the studs.

3. The connection according to claim 2, wherein the anti-rotation nut tabs prevent the flange nuts from rotating when additional flange nuts are threadably engaged to opposite ends of the studs.

4. The connection according to claim 1, wherein the anti-rotation nut tabs include a full nut opening and a partial nut opening.

5. The connection according to claim 4, wherein the full nut opening is positioned opposite of the partial nut opening, and a middle portion integrally joins the full nut opening and the partial nut opening.

6. The connection according to claim 4, wherein the full nut opening has a hexagon shape, and the partial nut opening has semi-circular shape.

7. The connection according to claim 1, wherein a first anti-rotation nut tab engages the first flange nut, and a second anti-rotation nut tab engages the second flange nut.

8. The connection according to claim 1, wherein a first anti-rotation nut tab engages the first flange nut, a second anti-rotation nut tab engages the second flange nut, and a third anti-rotation nut tab engages a third flange nut.

9. The connection according to claim 1, wherein the position cover snap fits to the fastener tray.

10. The connection according to claim 1, wherein the position cover positions the flange nuts over the openings of the fastener tray.

11. The connection according to claim 1, wherein a first fastener pack is on an opposite side of a seam between adjacent panels or sections as a second fastener pack.

12. The connection according to claim 1, wherein the first fastener pack holds a first flange nut and is on an external side of a panel or section, and a second fastener pack is on an internal side of the panel or section, and the second fastener pack holds the second flange nut.

13. The connection according to claim 1, wherein a first fastener pack is positioned over a seam between adjacent panels or sections, wherein a first threaded stud of the fastener pack passes through a first panel or first section, and a second threaded stud of the first fastener pack passes through a second panel or second section.

14. A connection for securing or connecting panels or sections together for a modular tower structure, the connection comprising:
    an interior friction plate having a plurality of holes;
    an exterior friction plate having a plurality of holes;
    threaded studs that pass through the holes in the interior friction plate, holes in the panels or section, and the holes in the exterior friction plate;
    a plurality of fastener packs, wherein the fastener packs comprise: a fastener tray, wherein a bottom wall of the fastener tray comprises a plurality of openings; a plurality of flange nuts; a plurality of anti-rotation nut tabs to engage the flange nuts; and, a position cover to position the flange nuts, wherein the position cover includes a top wall having a lower surface, and a plurality of cylindrical members extend from the lower surface of the top wall, wherein the cylindrical members define a recess that receives one of the flange nuts.

15. A connection for securing or connecting panels or sections together for a modular tower structure, the connection comprising:
    an interior friction plate having a plurality of holes;
    an exterior friction plate having a plurality of holes;
    threaded studs that pass through the holes in the interior friction plate, holes in the panels or section, and the holes in the exterior friction plate, wherein the threaded studs have a first threaded end and a second threaded end;
    a plurality of fastener packs, wherein the fastener packs comprise: a fastener tray, wherein a bottom wall of the fastener tray comprises a plurality of openings; a plurality of flange nuts; a plurality of anti-rotation nut tabs to engage the flange nuts; and, a position cover to position the flange nuts; and,
    a first end of one of the threaded studs threadably engages a first flange nut of a first fastener pack, and the second end of the one threaded stud threadably engages a second flange nut.

16. A modular tower structure, comprising:
    a plurality of sections, the sections comprise a plurality of panels; the panels comprising a curved or arcuate shape, the panels comprising vertical edges and horizontal edges;
    a vertical connection to connect or secure the panels at the vertical edges of the panels and form the sections, wherein the sections have a generally circular shape;
    the vertical connection comprising an interior vertical friction plate positioned over a seam between adjacent panels; an exterior vertical friction plate positioned over the seam between the adjacent panels; a fastener tray, wherein a bottom wall of the fastener tray comprises a plurality of openings; a plurality of flange nuts; a plurality of threaded studs, a plurality of anti-rotation nut tabs to engage the flange nuts; and, a position cover to position the flange nuts;
    a horizontal connection to connect or secure the sections at the horizontal edges of the panels;
    the horizontal connection comprising an interior friction plate that covers a seam between the adjacent sections; an exterior friction plate that covers the seam between the adjacent sections; a fastener tray, wherein a bottom wall of the fastener tray comprises a plurality of openings; a plurality of flange nuts; a plurality of threaded studs, a plurality of anti-rotation nut tabs to engage the flange nuts; and, a position cover to position the flange nuts.

17. The modular tower structure according to claim 16, wherein the plurality of sections are stacked on each other and the adjacent sections are connected or secured together by the horizontal connection.

18. The modular tower structure according to claim 16, wherein the threaded studs pass through holes in the interior vertical friction plate, the panel, and the exterior vertical friction plate.

19. The modular tower structure according to claim 16, wherein the threaded studs pass through holes in the interior horizontal friction plate, the panel, and the exterior horizontal friction plate.

* * * * *